US012672098B2

(12) United States Patent
Hekkala et al.

(10) Patent No.: US 12,672,098 B2
(45) Date of Patent: Jun. 30, 2026

(54) NON-STATIONARY TIME-DOMAIN POSITIONING WITH FREQUENCY HOPPING

(71) Applicant: Nokia Technologies Oy, Espoo (FI)

(72) Inventors: Aki Hekkala, Oulu (FI); Hyun-Su Cha, Chicago, IL (US); Dileep Kumar, Espoo (FI)

(73) Assignee: Nokia Technologies Oy, Espoo (FI)

( * ) Notice: Subject to any disclaimer, the term of this patent is extended or adjusted under 35 U.S.C. 154(b) by 356 days.

(21) Appl. No.: 18/374,428

(22) Filed: Sep. 28, 2023

(65) Prior Publication Data

US 2025/0113331 A1     Apr. 3, 2025

(51) Int. Cl.
  H04B 1/715     (2011.01)
  H04L 25/02     (2006.01)
  H04W 64/00     (2009.01)

(52) U.S. Cl.
  CPC .......... H04W 64/006 (2013.01); H04B 1/715 (2013.01); H04L 25/0222 (2013.01)

(58) Field of Classification Search
  CPC ... H04W 64/00; H04W 76/28; H04W 64/003; H04W 24/02; H04W 64/006; H04W 16/14; H04W 24/10; H04W 72/04; H04W 16/10; H04W 72/23; H04W 4/029; H04W 72/0446; H04W 4/02; H04W 40/20; H04W 72/046; H04W 72/51; H04W 72/566; H04W 16/28; H04W 28/26; H04W 16/18;

(Continued)

(56) References Cited

U.S. PATENT DOCUMENTS

2008/0170602 A1 *  7/2008  Guey ................ H04B 1/70735
                                                     375/342
2011/0142115 A1 *  6/2011  Wang .................. H04L 25/0224
                                                     375/340

(Continued)

OTHER PUBLICATIONS

Ericsson "Revised WID on Enhanced Support of Reduced Capability NR Devices" 3GPP TSG RAN Meeting #100 (RP-230903) Taipei, Jun. 12-14, 2023.

(Continued)

*Primary Examiner* — Nimesh Patel
(74) *Attorney, Agent, or Firm* — Robert P. Michal, Esq.; Rimon PC

(57) ABSTRACT

An apparatus comprising: at least one processor; and at least one memory storing instructions that, when executed by the at least one processor, cause the apparatus at least to: determine Doppler shift information per transmission reception point per frequency hopping block; combine the frequency hopping blocks associated with positioning reference signals received from a transmission reception point per transmission reception point; determine a time of arrival of the received positioning reference signals per transmission reception point, based on the combined frequency hopping blocks; transmit, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and transmit, to the location management function, the time of arrival per transmission reception point.

18 Claims, 17 Drawing Sheets

(58) Field of Classification Search

CPC ... H04W 24/04; H04W 12/104; H04W 12/61; H04W 4/023; H04W 4/06; H04W 92/18; G01S 5/0205; G01S 1/0428; G01S 5/0236; G01S 5/10; G01S 5/0244; G01S 5/0252; G01S 5/06; G01S 5/14; G01S 13/878; G01S 19/40; G01S 5/0009; G01S 13/06; G01S 13/08; G01S 19/42; G01S 2205/008; G01S 7/52066; G01S 15/8979; G01S 7/356; G01S 13/88; G01S 13/20; G01S 2013/932; G01S 13/584; G01S 7/4091; G01S 7/5205; G01S 13/003; G01S 7/52085; G01S 13/26; G01S 13/34; G01S 13/345; G01S 13/536; G01S 15/584; G01S 19/254; G01S 19/29; G01S 15/8984; G01S 17/58; G01S 7/5209; G01S 7/52095; G01S 7/52092; H04B 1/713; H04B 1/715; H04B 7/0626; H04B 17/318; H04B 1/7143; H04B 17/309; H04B 7/0632; H04B 7/0682; H04B 17/252; H04B 7/068; H04B 10/0795; H04B 17/27; H04B 7/0413; H04B 7/0617; H04B 7/0408; H04B 7/0452; H04B 17/382; H04B 7/18519; H04B 7/2621; H04B 7/06; H04B 7/0695; H04B 7/2041; H04B 7/216; H04B 7/2634; H04L 5/0053; H04L 25/0222; H04L 5/0048; H04L 5/0007; H04L 5/0012; H04L 5/005; H04L 27/261; H04L 25/0224; H04L 5/0023; H04L 27/2613; H04L 5/0005; H04L 1/0606; H04L 1/0618; H04L 5/0016; H04L 25/0226; H04L 41/16; H04L 65/611; H04L 1/06; H04L 25/02; H04L 25/0202; H04L 27/2647; H04L 27/26885; H04L 2209/80; H04L 25/0254; H04L 5/0094; H04L 5/026; G06F 30/27; G06F 17/16; G06F 18/24; G06F 18/253; G06T 2207/20081

See application file for complete search history.

(56)     References Cited

U.S. PATENT DOCUMENTS

| | | | | |
|---|---|---|---|---|
| 2019/0349964 A1* | 11/2019 | Liou | .................. | H04W 72/046 |
| 2022/0109466 A1* | 4/2022 | Manolakos | .......... | H04W 72/51 |
| 2023/0292254 A1* | 9/2023 | Kuchi | .................. | H04L 1/1819 |
| 2025/0080160 A1* | 3/2025 | Tayyab | ................. | H04B 1/713 |
| 2025/0310042 A1* | 10/2025 | Shima | .................. | H04L 5/0012 |

OTHER PUBLICATIONS

Intel Corporation, CATT, Ericsson "New WID on Expanded and Improved NR Positioning" 3GPP TSG RAN Meeting #98-e (RP-223549) Electronic Meeting, Dec. 12-16, 2022.

3rd Generation Partnership Project; Technical Specification Group Radio Access Network; NR; User Equipment (UE) Radio Access Capabilities (Release 17) Section 4.2.21 pp. 219-221. 3GPP TS 38.306 V17.2.0 (Sep. 2022).

* cited by examiner

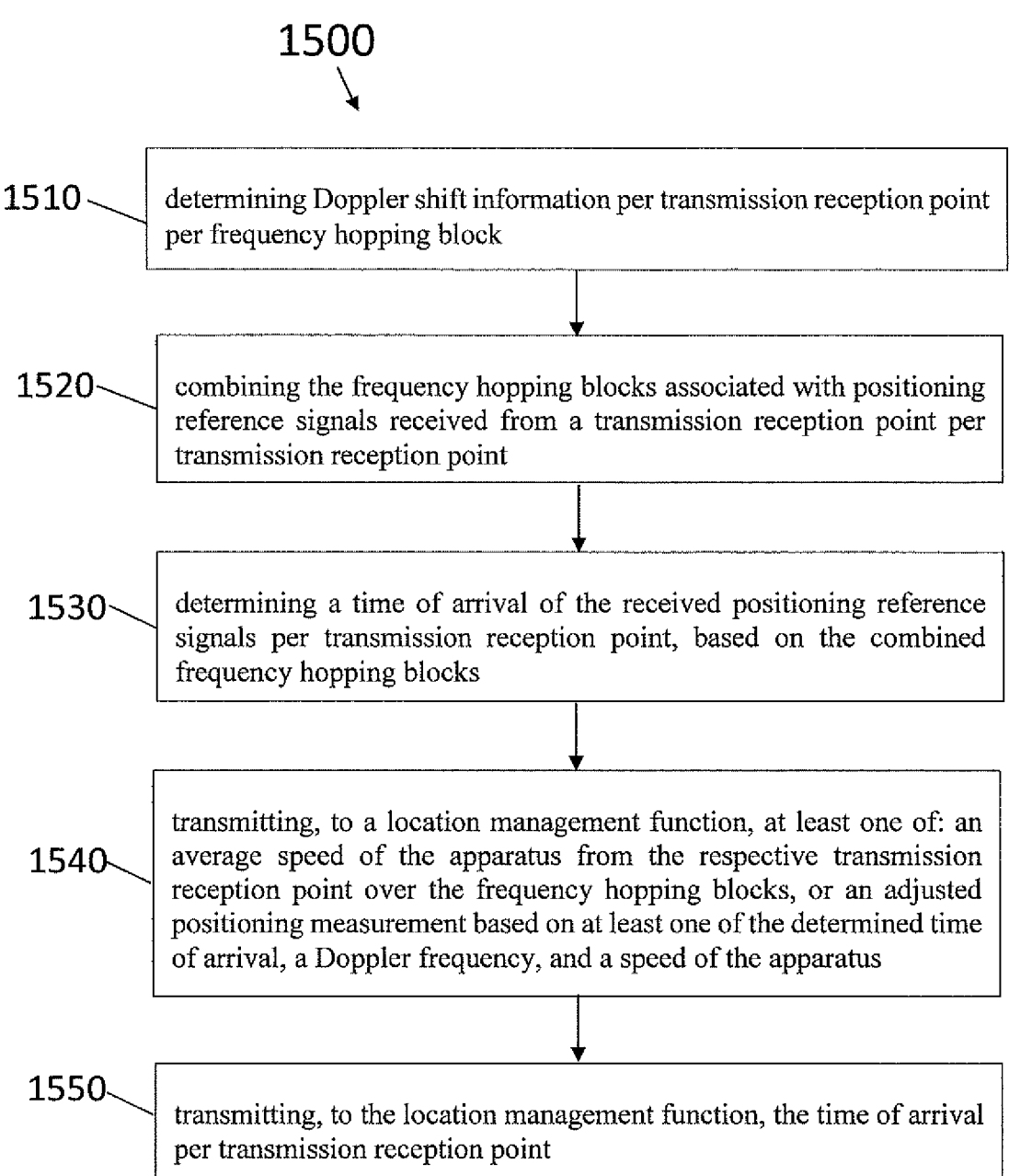

1500

1510 — determining Doppler shift information per transmission reception point per frequency hopping block 1520 — combining the frequency hopping blocks associated with positioning reference signals received from a transmission reception point per transmission reception point 1530 — determining a time of arrival of the received positioning reference signals per transmission reception point, based on the combined frequency hopping blocks 1540 — transmitting, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus 1550 — transmitting, to the location management function, the time of arrival per transmission reception point

FIG. 15

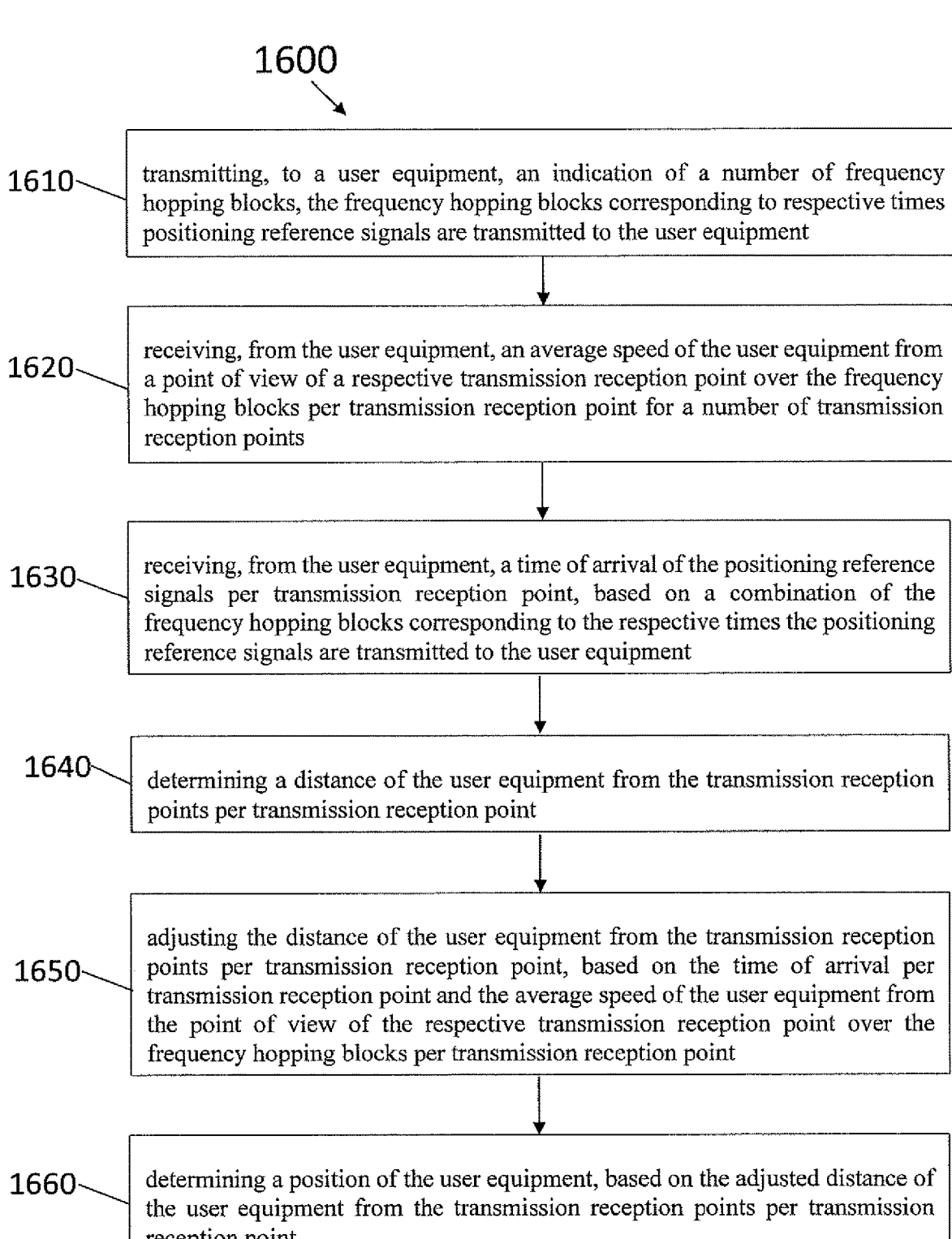

1600

1610 — transmitting, to a user equipment, an indication of a number of frequency hopping blocks, the frequency hopping blocks corresponding to respective times positioning reference signals are transmitted to the user equipment 1620 — receiving, from the user equipment, an average speed of the user equipment from a point of view of a respective transmission reception point over the frequency hopping blocks per transmission reception point for a number of transmission reception points 1630 — receiving, from the user equipment, a time of arrival of the positioning reference signals per transmission reception point, based on a combination of the frequency hopping blocks corresponding to the respective times the positioning reference signals are transmitted to the user equipment 1640 — determining a distance of the user equipment from the transmission reception points per transmission reception point 1650 — adjusting the distance of the user equipment from the transmission reception points per transmission reception point, based on the time of arrival per transmission reception point and the average speed of the user equipment from the point of view of the respective transmission reception point over the frequency hopping blocks per transmission reception point 1660 — determining a position of the user equipment, based on the adjusted distance of the user equipment from the transmission reception points per transmission reception point

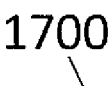

1710 — receiving, from a plurality of transmission reception points, an average speed of a user equipment from a point of view of a respective transmission reception point over a number of frequency hopping blocks per transmission reception point 1720 — receiving, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment 1730 — determining a distance of the user equipment from the plurality of transmission reception points 1740 — adjusting the distance of the user equipment from the transmission reception points per transmission reception point, based on at least one: of the positioning measurement for the transmission reception points, or the average speed of the user equipment from the point of view of each transmission reception point over the frequency hopping blocks 1750 — determining a position of the user equipment, based on the adjusted distance of the user equipment from the transmission reception points per transmission reception point

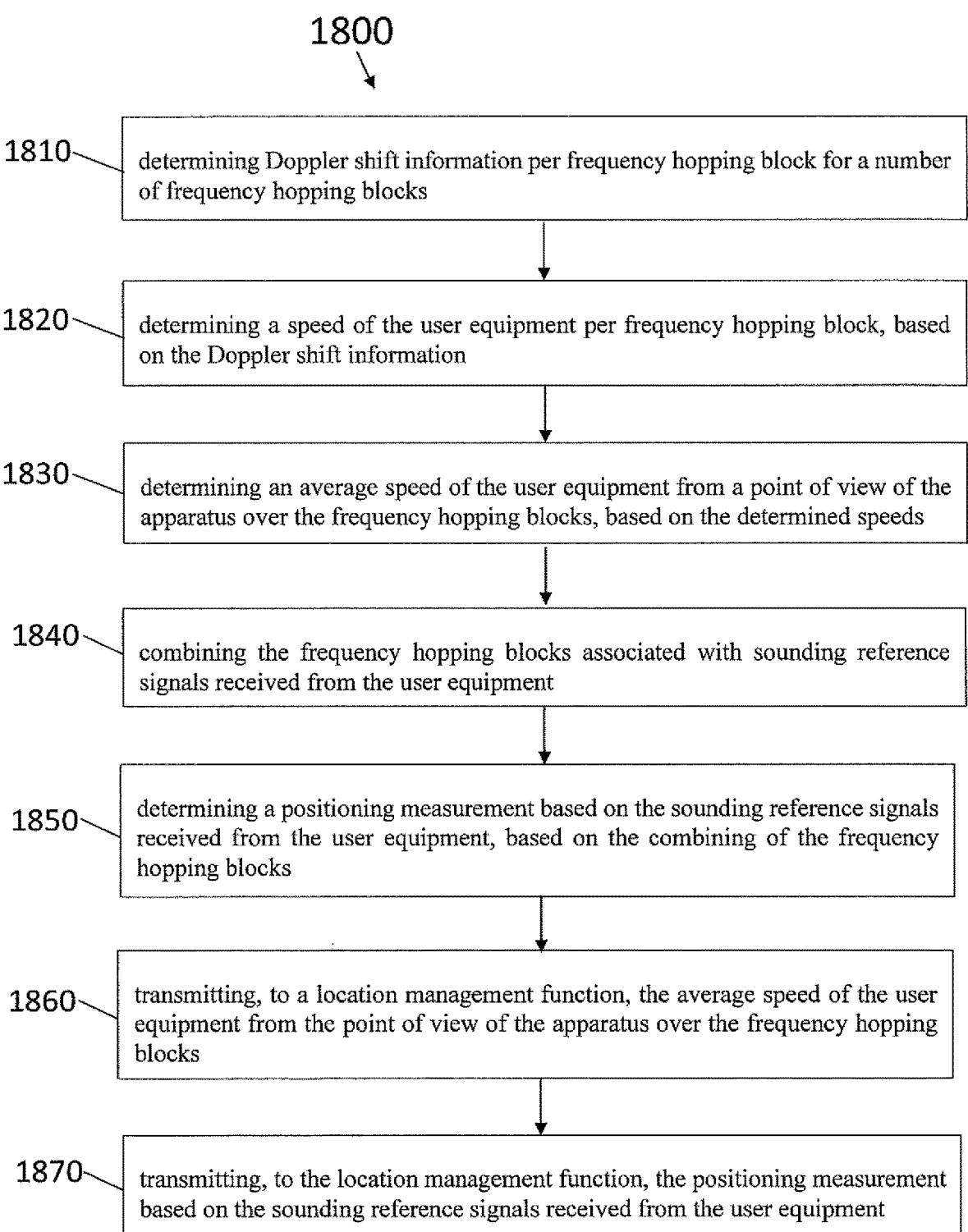

1810 — determining Doppler shift information per frequency hopping block for a number of frequency hopping blocks 1820 — determining a speed of the user equipment per frequency hopping block, based on the Doppler shift information 1830 — determining an average speed of the user equipment from a point of view of the apparatus over the frequency hopping blocks, based on the determined speeds 1840 — combining the frequency hopping blocks associated with sounding reference signals received from the user equipment 1850 — determining a positioning measurement based on the sounding reference signals received from the user equipment, based on the combining of the frequency hopping blocks 1860 — transmitting, to a location management function, the average speed of the user equipment from the point of view of the apparatus over the frequency hopping blocks 1870 — transmitting, to the location management function, the positioning measurement based on the sounding reference signals received from the user equipment

FIG. 18

NON-STATIONARY TIME-DOMAIN POSITIONING WITH FREQUENCY HOPPING

TECHNICAL FIELD

The examples and non-limiting example embodiments relate generally to communications and, more particularly, to non-stationary time-domain positioning with frequency hopping.

BACKGROUND

It is known to estimate a position of a terminal device in a communication network using reference signals.

SUMMARY

In accordance with an aspect, an apparatus includes at least one processor; and at least one non-transitory memory storing instructions that, when executed by the at least one processor, cause the apparatus at least to: determine Doppler shift information per transmission reception point per frequency hopping block; combine the frequency hopping blocks associated with positioning reference signals received from a transmission reception point per transmission reception point; determine a time of arrival of the received positioning reference signals per transmission reception point, based on the combined frequency hopping blocks; transmit, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and transmit, to the location management function, the time of arrival per transmission reception point.

In accordance with an aspect, an apparatus includes at least one processor; and at least one non-transitory memory storing instructions that, when executed by the at least one processor, cause the apparatus at least to: transmit, to a user equipment, an indication of a number of frequency hopping blocks, the frequency hopping blocks corresponding to respective times positioning reference signals are transmitted to the user equipment; receive, from the user equipment, an average speed of the user equipment from a point of view of a respective transmission reception point over the frequency hopping blocks per transmission reception point for a number of transmission reception points; receive, from the user equipment, a time of arrival of the positioning reference signals per transmission reception point, based on a combination of the frequency hopping blocks corresponding to the respective times the positioning reference signals are transmitted to the user equipment; determine a distance of the user equipment from the transmission reception points per transmission reception point; adjust the distance of the user equipment from the transmission reception points per transmission reception point, based on the time of arrival per transmission reception point and the average speed of the user equipment from the point of view of the respective transmission reception point over the frequency hopping blocks per transmission reception point; and determine a position of the user equipment, based on the adjusted distance of the user equipment from the transmission reception points per transmission reception point.

In accordance with an aspect, an apparatus includes at least one processor; and at least one non-transitory memory storing instructions that, when executed by the at least one processor, cause the apparatus at least to: receive, from a plurality of transmission reception points, an average speed of a user equipment from a point of view of a respective transmission reception point over a number of frequency hopping blocks per transmission reception point; receive, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment; determine a distance of the user equipment from the plurality of transmission reception points; adjust the distance of the user equipment from the transmission reception points per transmission reception point, based on at least one: of the positioning measurement for the transmission reception points, or the average speed of the user equipment from the point of view of each transmission reception point over the frequency hopping blocks; and determine a position of the user equipment, based on the adjusted distance of the user equipment from the transmission reception points per transmission reception point.

In accordance with an aspect, an apparatus includes at least one processor; and at least one non-transitory memory storing instructions that, when executed by the at least one processor, cause the apparatus at least to: determine Doppler shift information per frequency hopping block for a number of frequency hopping blocks; determine a speed of the user equipment per frequency hopping block, based on the Doppler shift information; determine an average speed of the user equipment from a point of view of the apparatus over the frequency hopping blocks, based on the determined speeds; combine the frequency hopping blocks associated with sounding reference signals received from the user equipment; determine a positioning measurement based on the sounding reference signals received from the user equipment, based on the combining of the frequency hopping blocks; transmit, to a location management function, the average speed of the user equipment from the point of view of the apparatus over the frequency hopping blocks; and transmit, to the location management function, the positioning measurement based on the sounding reference signals received from the user equipment.

BRIEF DESCRIPTION OF THE DRAWINGS

The foregoing aspects and other features are explained in the following description, taken in connection with the accompanying drawings.

FIG. 15 is an example method, based on the examples described herein.

FIG. 16 is an example method, based on the examples described herein.

FIG. 17 is an example method, based on the examples described herein.

FIG. 18 is an example method, based on the examples described herein.

DETAILED DESCRIPTION OF EXAMPLE EMBODIMENTS

Figure 1:
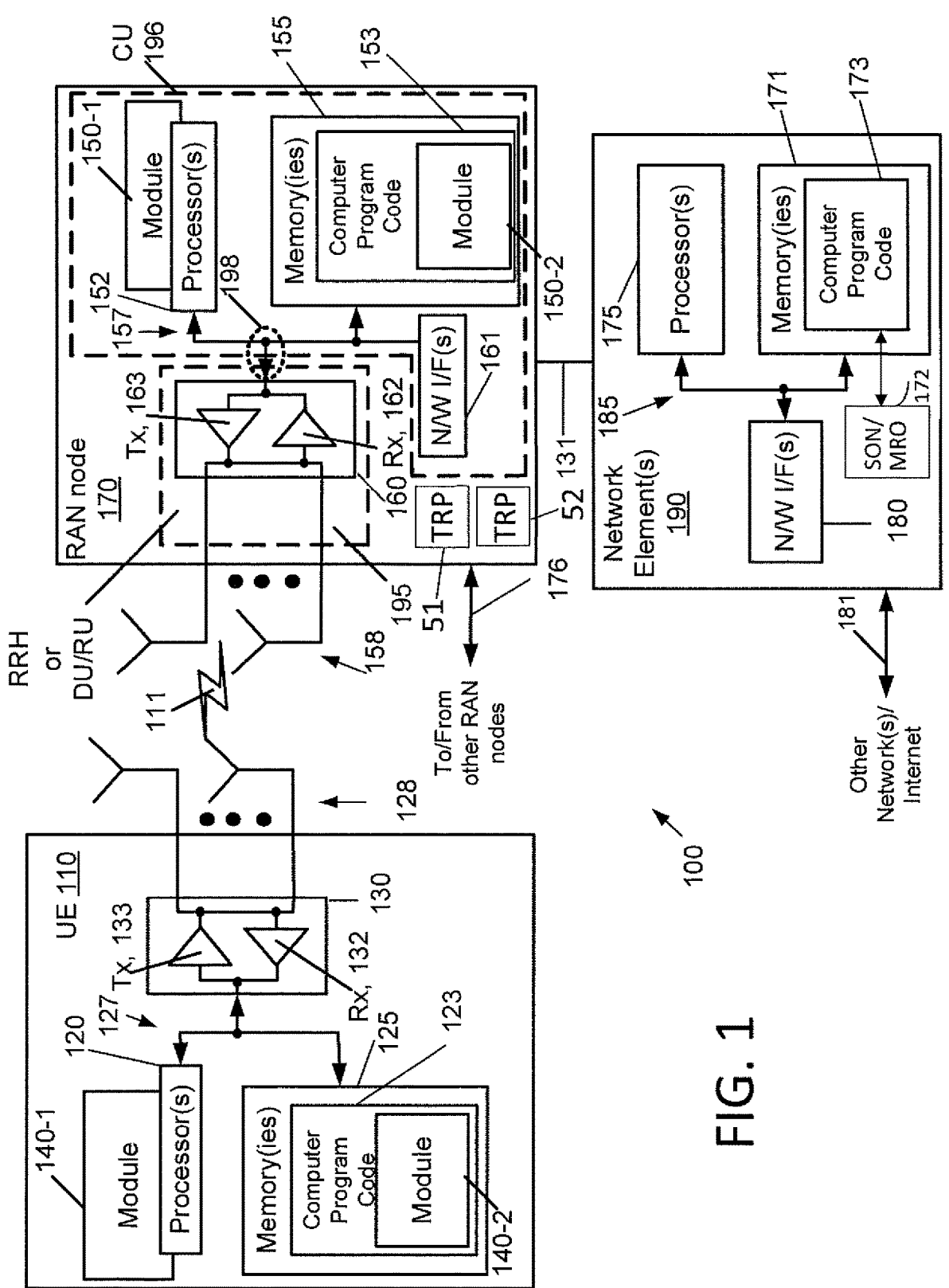
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises TRP 51 and TRP 52, in addition to the TRP represented by transceiver 160. Similar to transceiver 160, TRP 51 and TRP 52 may each include a transmitter and a receiver. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the LAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein. Thus, computer program code 123, module 140-1, module 140-2, and other elements/features shown in FIG. 1 of UE 110 may implement user equipment related aspects of the examples described herein.

Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

The technical context of the examples described herein is described in two 3GPP WIs, eRedCap [RP-230903] and positioning [RP-223549].

Figure 2:
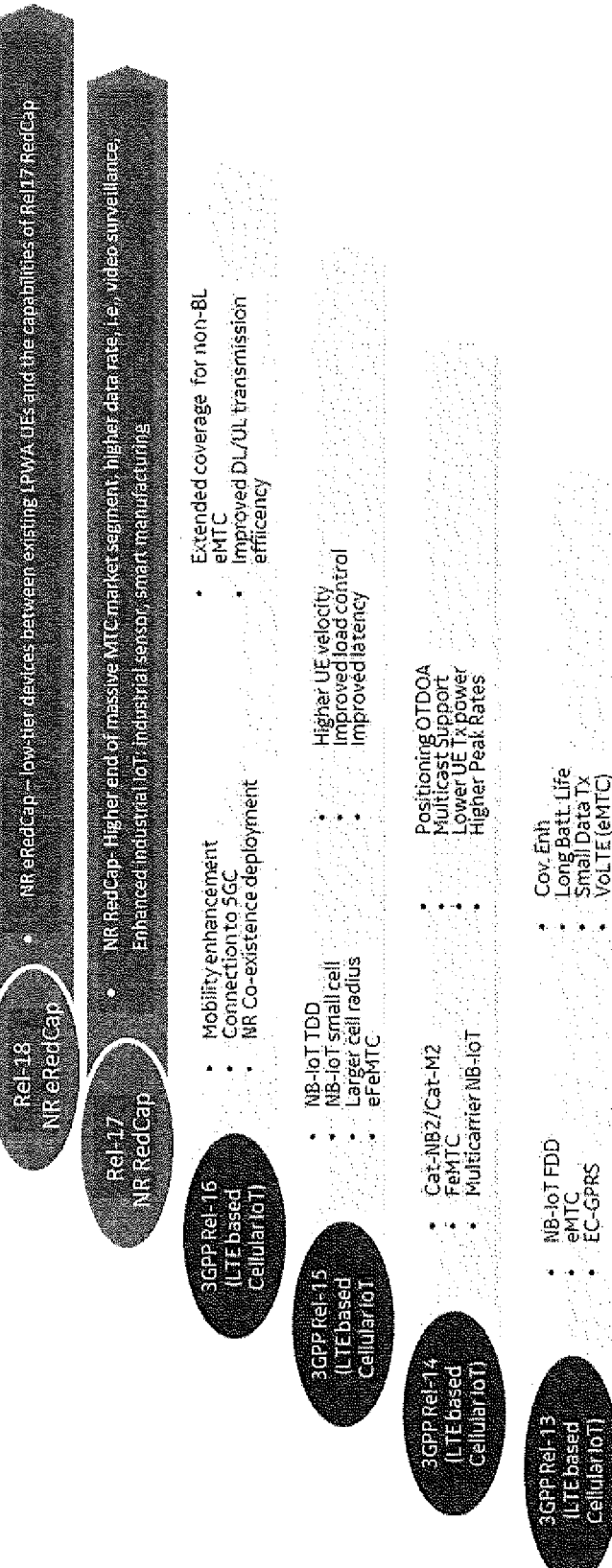
FIG. 2 depicts the evolution of IoT devices.

The reduced capability devices are NR low-tier, i.e., cost-efficient, devices with reduced capacity and capability. The cost-efficiency is achieved by dropping from the feature list many significant HW level features. The 3GPP detailed definition of a RedCap UE is in TS38.306, section 4.2.21, which is prepared for a Rel-17 RedCap, but the description therein is valid for eRedCap of Rel-18 for hardware (HW) as well. FIG. 2 provides an understanding of RedCap/eRedCap and the evolution of IoT devices since Rel-13.

While the scope of the examples described herein is in the positioning of user equipment devices including RedCap devices and eRedCap devices, no further elaboration of eRedCap is worked out. The rest of the context is for the positioning, because the positioning WI includes also the RedCap (hereinafter RedCap refers to RedCap and eRedCap) specific positioning section.

The Rel-18 positioning WI [RP-223549] related to expanded and improved NR positioning was agreed for further enhancement of 3GPP RAN1 NR positioning. One of the main topics was to study the RedCap UE. The following is a short capture from the WID [RP-230903]:

---

Specify support of positioning for UEs with Reduced Capabilities (RedCap UEs)
Specify support of Frequency Hopping (FH) beyond maximum RedCap UE bandwidth for reception of DL PRS and transmission of UL SRS for positioning [RAN1, RAN2].
NOTE: The complexity of the corresponding capabilities for RedCap UEs should be addressed for the introduction of appropriate capabilities for RedCap UEs.

---

The frequency hopping technique was developed in 3GPP to resolve the bandwidth problem for the time-domain positioning method. For ToA (time of arrival), the signal spectrum size is linearly related to the measurement accuracy under ideal conditions (refer to the discussion herein related to an illustrative example for the relation of bandwidth and time-domain accuracy and the discussion of Equation 4 and standard deviation $$\sigma_i^{ToA}).$$

While the RedCap bandwidth is limited to 20 MHz at maximum for FR1 frequencies, this small bandwidth means the accuracy is several meters. It is worth highlighting that the sounding bandwidth is not a foe but a friend, since the network node can efficiently resolve the multi-path components and obtain precise ToF/TDoA measurements due to higher temporal resolutions, which mainly inherits from the large bandwidth configurations.

Figure 3:
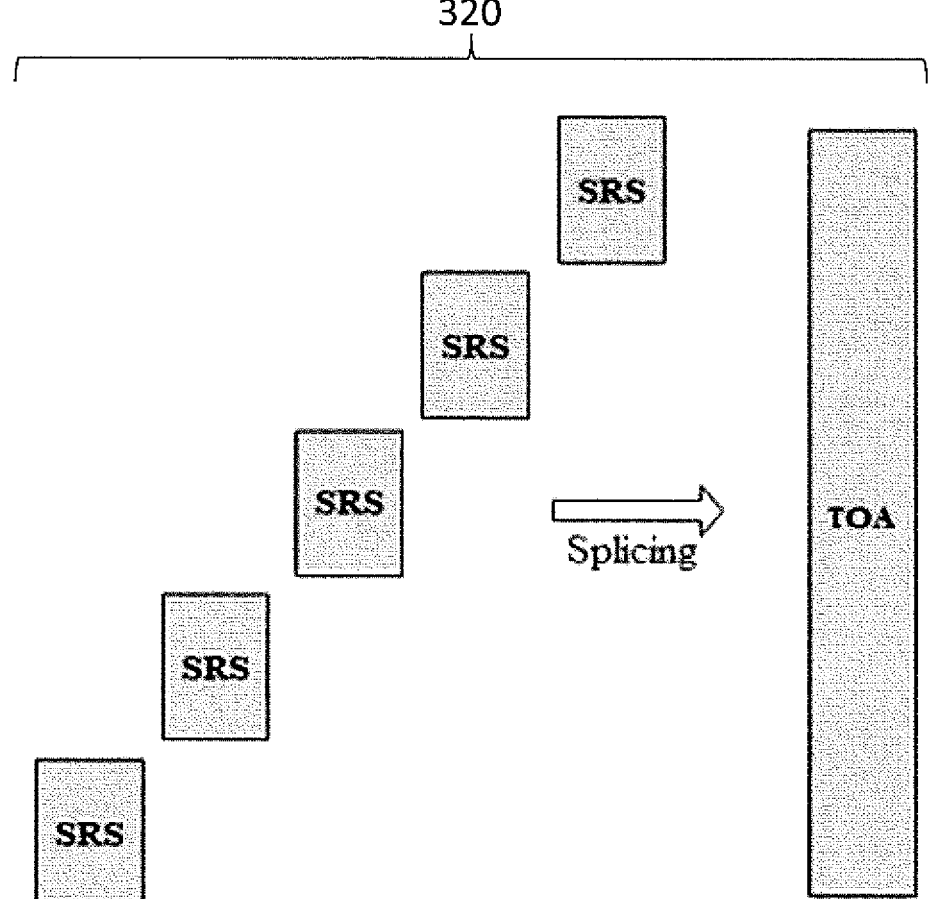
FIG. 3 depicts a non-overlapping frequency hopping scheme.

FIG. 3 shows a non-overlapping frequency hopping scheme (320).

The mobility of the UE 110 has been left out for RedCap positioning (i.e., the mobility of the UE 110 has not been addressed for RedCap positioning). However, it is easily understood that the positioning cannot be limited to a stationary RedCap UE only. With the frequency hopping the stationarity versus moving UE is further highlighted, while the gap between the hops is up to 5 ms.

Similarly to a RedCap UE, any method where the total bandwidth is a combination of sub-bands, thus higher positioning accuracy is searched for, has the same mobility problem. For example, the carrier aggregation may use non-contiguous bands to aggregate the measurement. Even though the carrier components are transmitted simultaneously, their reference signals used for the positioning may have time differences. The examples described herein resolve the mobility question. The mobility problem assumes the sub-bands are transmitted like in RedCap FH, as a sequence of bands. If the bands were transmitted at the same time, no time issue is seen.

Frequency-domain compensation (taking movement into account) for carrier-phased positioning (CPP) relates to the mobility case in the frequency-domain for NR UE devices. The compensation described herein is in the time-domain for time-domain based positioning methods like ToA (time of arrival). Furthermore, the compensation derived is applied for the frequency hopping case, thus, the compensation is applicable to any bandwidth aggregation technique. Any post-processing technique for the measured signals is also applicable, e.g., to increase the integrity of the reported location coordinates.

Regarding the latest standardization work in 3GPP, below are some of the agreement captures of the latest RAN1 #114 meeting (agenda item 9.5.5 RedCap Positioning). Note that none of the agreements discuss the mobility, but the emphasis is on other subjects, like the hopping pattern and configurations.

UL SRS frequency hopping pattern:

---

| Agreement |
| --- |
| For the SRS Tx hopping, both hopping patterns (i.e. one cycle containing all the hops) that can span across slots or fit within one slot are supported.<br>FFS: determination of the starting symbol position for each hop<br>FFS: duration of each hop |

| Agreement |
| --- |
| SRS for positioning with Tx hopping can be configured outside of the active UL BWP<br>The configuration may include SCS, CP size and bandwidth (position and size), which can use a SCS, CP size and bandwidth different from the UL active BWP<br>Additional note:<br>For the first agreement, one cycle of SRS frequency hopping can be completely done within a slot or it can span multiple slots. |

UL SRS frequency hopping configurations:

---

| Agreement |
| --- |
| For SRS Tx hopping, the configuration includes:<br>a hop bandwidth common to all hops<br>FFS: possible values<br>a single overlap value can be configured for all hops for the SRS resource<br>FFS: possible values |

-continued

| Agreement |
| --- |
| The starting slot offset and starting symbol for the SRS resource with tx hopping (first hop) |
| FFS: possible values |
| the starting slot offset and symbol for each of the hops following the first hop, |
| Note Up to ran2 to design signaling of the starting position for each hop, i.e. how the SRS resource configuration signaling indicates the starting slot offset and starting symbol for the hops following the first hop |
| FFS: possible values |
| The number of consecutive symbols in a hop common to all hops |
| FFS: possible values |
| The number of hops |
| FFS: possible values |
| UE does not expect to be configured for any hops across slot boundaries, i.e.the starting position + duration of a hop cannot exceed a slot duration |
| FFS: whether/how special handling for the last hop overlap |

Figure 4:
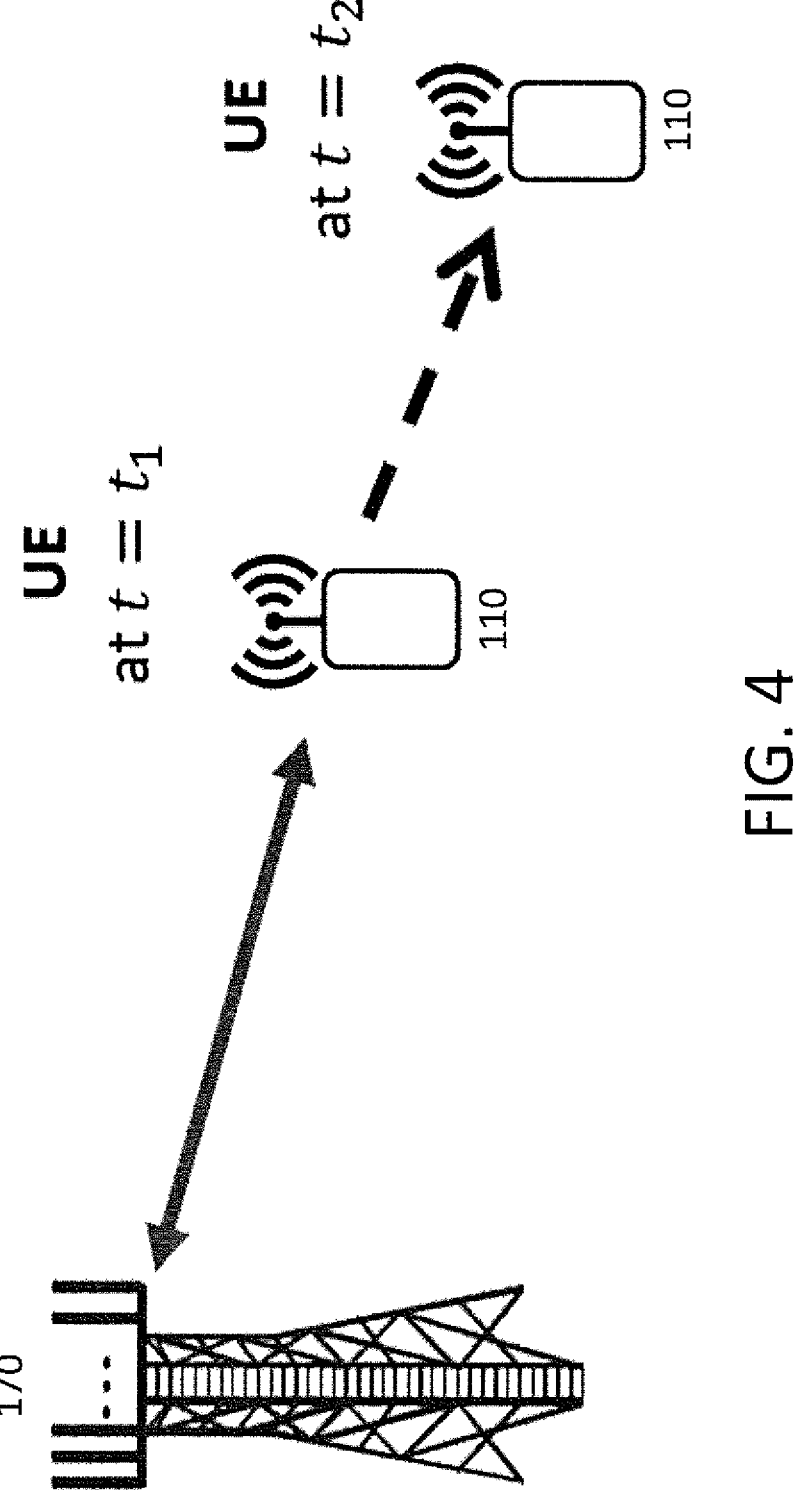
FIG. 4 shows a position change of a UE as a function of time.

FIG. 4 shows position change of UE 110 as the function of time. Positioning of a UE answers to the question where the UE was at time moment $t_1$. The answer might be available for the user, the network or any other entity accredited to request the information, at time moment $t_2 > t_1$. If the UE moves, it is not anymore at time moment $t_2$ in the location of time moment $t_1$, within the measurement system accuracy. Even to get the information under the condition of the movement is dependent on whether the system knows to operate under the condition of the movement, regardless of the direction or the speed of the movement. The examples described herein relate to how to teach the system to read properly the measured signal and how to operate the post-processing to make the necessary corrections to get an adequate location information, again regardless of the direction or the speed of the movement.

Figure 5:
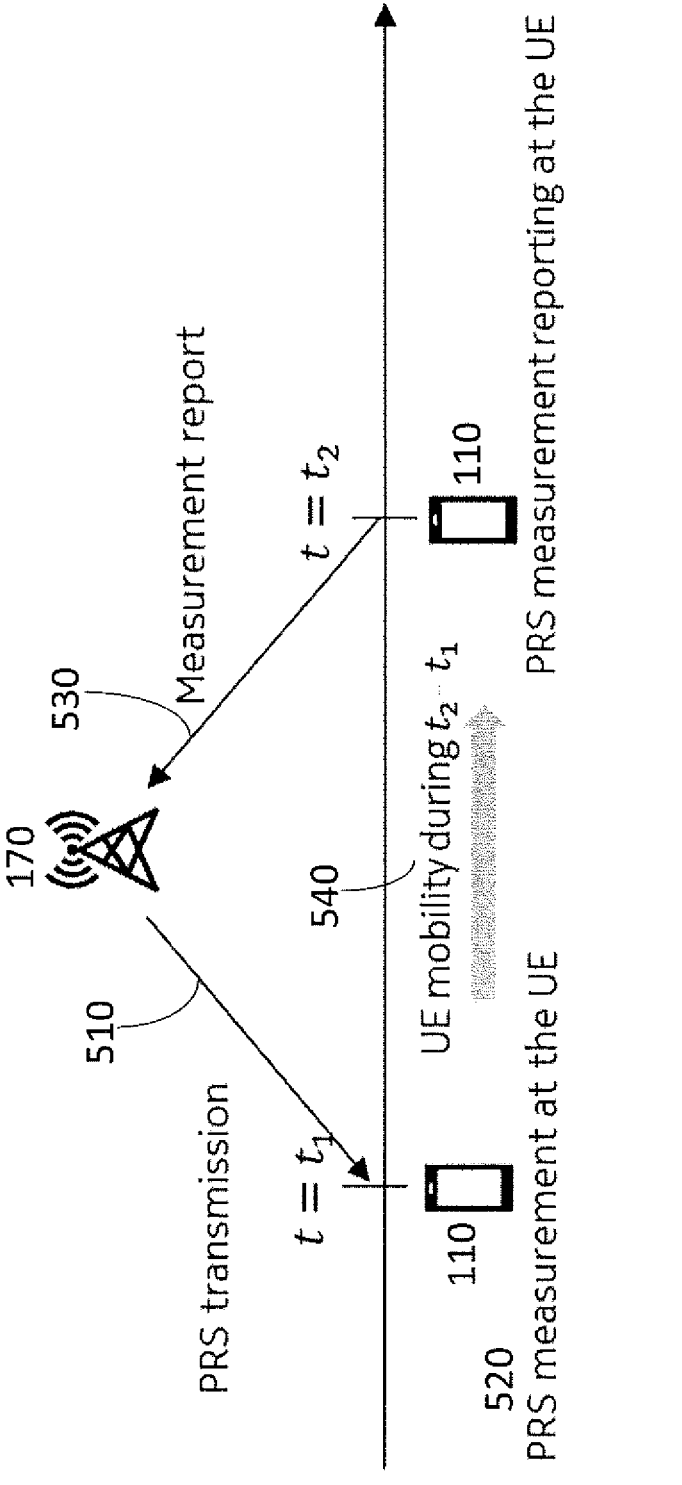
FIG. 5 shows an illustrative example of UE mobility and its impact in the downlink direction.

FIG. 5 is an illustrative example of UE mobility and its impact. In FIG. 5 the downlink direction is used. One of the issues the examples described herein solve may be described with reference to FIG. 5. FIG. 5 shows DL PRS transmission 510 and measurement (520, 530) between the gNB 170 and the UE 110. The UE 110 in FIG. 5 performs the measurement 520 (which may be "frequency hopped" (320) as shown in FIG. 3) at t=$t_1$ and the UE 110 reports the measurement (530) at t=$t_2$, according to the configuration. Note that in the frequency hopping case the movement per hop may vary from hop to hop. The positioning accuracy requirements are listed in TR 38.859, section 6.5 thereinafter. 3GPP has been trying to support high accuracy positioning performance even for the RedCap UE. The mobility of the UE 110 is a critical issue to achieve high enough accuracy positioning.

Considering the above, the mobility during $t_2 - t_1$ (540) could be critical to positioning accuracy. The examples and embodiments described herein solve this problem.

The problem is equal regardless of the moving component of the system, or even that both ends of the radio link move. The most common moving component is the UE, but the methods described herein are easily extended, for example, to a flying unmanned aerial vehicle (UAV). Similarly, non-terrestrial networks include satellites and high altitude platform stations (HAPS) where all but geostationary satellites move with regard to the ground station. Thus the examples described herein are also applicable to satellites and high altitude platform stations.

While the frequency hopping resolves the bandwidth issue for a stationary RedCap UE (see the bandwidth discussion herein), at least when no any impairment is considered for the bandwidth combination, the movement of RedCap UE during the sweep of hops is an additional error coefficient. The algorithm presented works both for DL (main signaling diagram in FIG. 9) and UL (frequency hopping schematic in FIG. 8), and some details regarding where and how the operations are done, are also possible to variate.

Based on the measured Doppler shift (DS) per hop, the receiver makes the predictions on what speed the transmitter/receiver has moved, and calculates the time domain correction coefficient. In the algorithmic form, the method is presented as follows as operations 1-9:

1. Make the decision on how many blocks are to be read and used for the next operations (more details described herein).
2. Read DS information per TRP per FH block (refer for example to FIG. 7, FIG. 8, and FIG. 9).
3. Translate or transform DS information to speed of UE per TRP per FH block
4. Average the speed information over the FH blocks, which may be used to determine the speed of the UE.
5. Apply the FH block combination per TRP, which may be used to determine Full BW.
6. Use the Full BW to read the receiving time per TRP (ToA), refer for example to $T_{1,i}$ in Equation 1.
7. Apply the speed of the UE to correct ToA per TRP, to determine a time compensated ToA per TRP (more details described herein).
8. LMF calculates the position of UE.
9. LMF checks the integrity. If the integrity is not reached, refine or re-adjust the FH blocks (more details described herein).

Several variations over the main use cases are further described herein.

Figure 6:
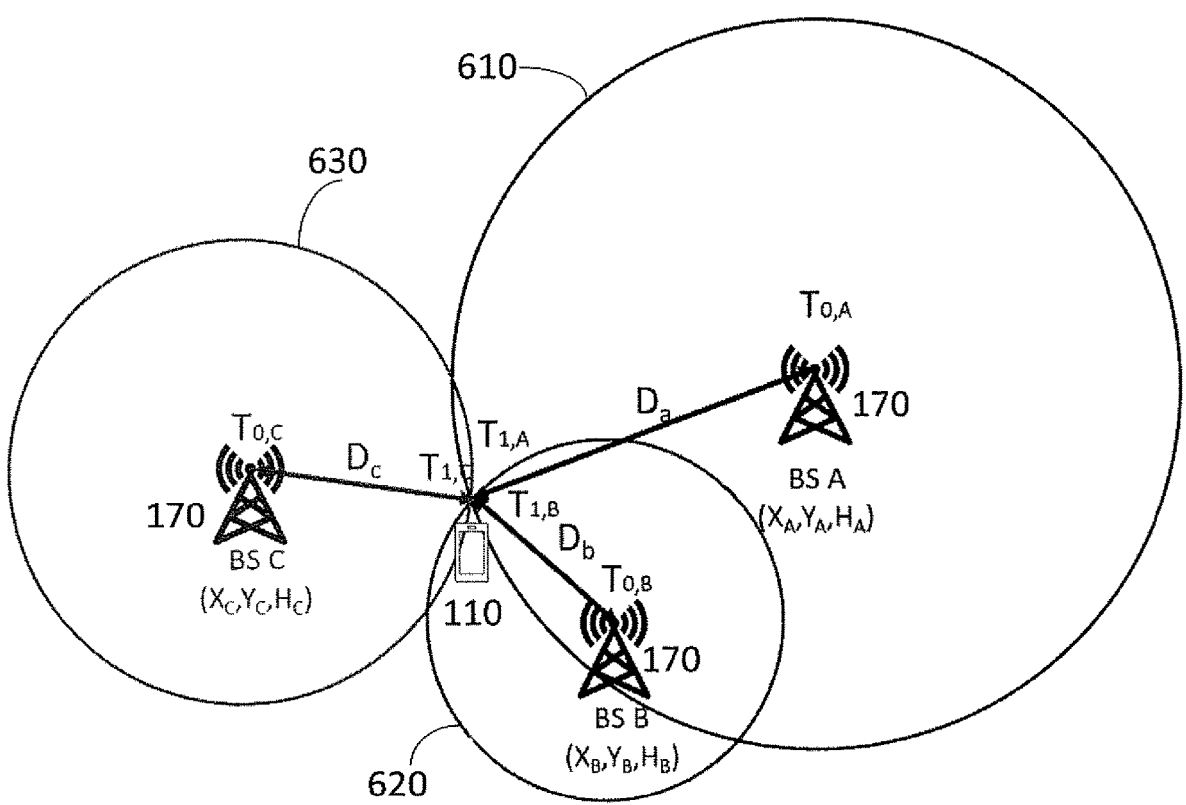
FIG. 6 depicts an overview of a time-domain based positioning scheme.

The overview of a time-domain based positioning scheme is shown in FIG. 6. It works fine for a stationary UE 110. The downlink direction (from the base stations 170 to the UE 110) is shown, but without loss of generality the direction of signaling could be reversed (in the uplink direction, from the UE 110 to the base stations 170). The number of base stations 170 is at minimum three, any other higher number of TRPs is fine, and normally increases the positioning accuracy. Using the symbols from FIG. 6, the distance calculation is made by the formula $$D_i = c \cdot (T_{1,i} - T_{0,i}), \qquad \text{(Equation 1)}$$

In Equation 1 above, i=A, B or C. The transmission time moment $T_{0,i}$ is ideally the same for all the Base Stations (BS) 170. The arrival time $T_{1,i}$ naturally changes depending on the distance ($D_1$) for BS A, BS B or BS C. The coordinate triples (X, Y, H) per BS (where each BS is a TRP) are known, being the locations of TRPs.

Figure 10:
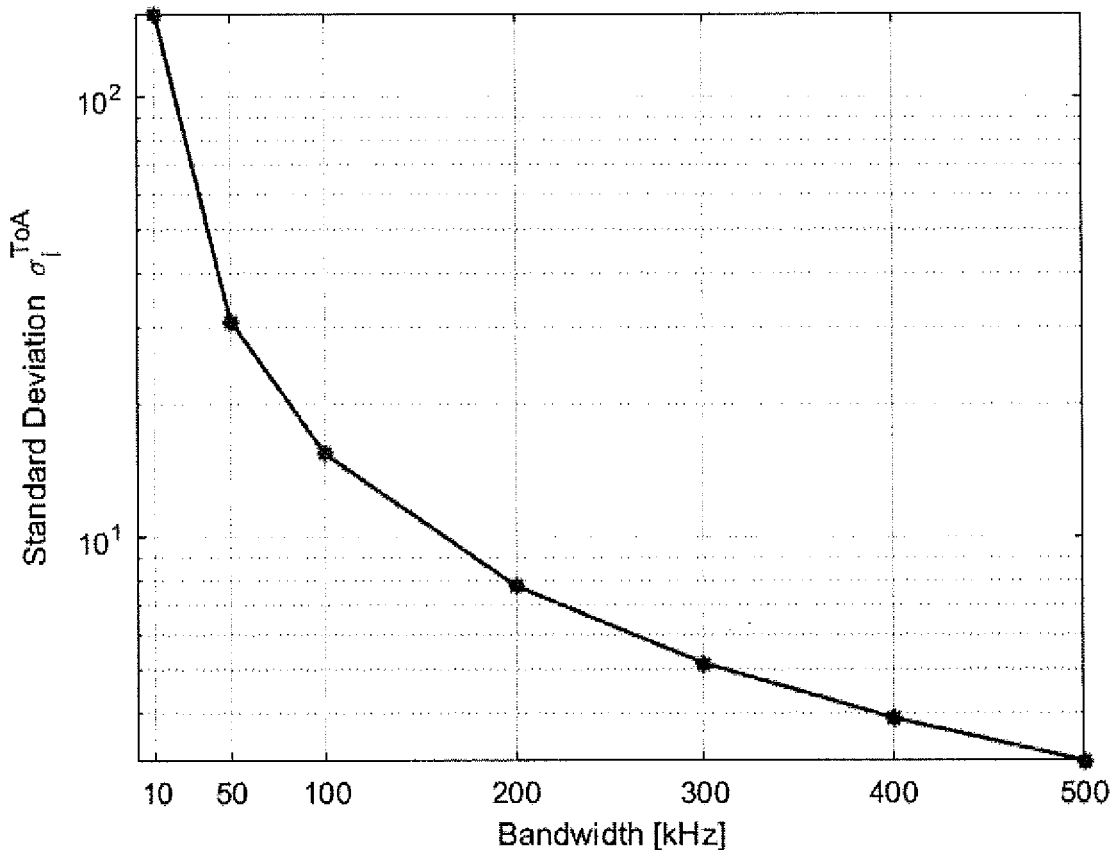
FIG. 10 shows an illustrative example of achievable accuracy with the increasing bandwidth of the sounding reference signal.

Refer to the discussion herein regarding Equation 4 and FIG. 10 to understand the relationship between bandwidth and time-domain accuracy, as this relates to the idea presented herein.

The problem of the mobility when considering the RedCap UE positioning is not severe for low-speed RedCap UE. If the frequency hopping case shown in FIG. 3 is assumed, the worst case time between every hop is 5 ms, and 5 hops altogether, the difference between the first and the last hop (from center to center) is 20 ms+4×duration of SRS symbol≈20 ms. If it is assumed that because of the mobility, a maximum extra error of 0.5 m due to mobility is allowed (note that in some embodiments described herein the method to sum up the error components present in the total inaccuracy calculation is not considered), this corresponds to $$v = \frac{0.5 \text{ m}}{20 \text{ ms}} = 25 \text{ m/s} = 90 \text{ km/h}.$$

If the system is less tolerant, slower speed is then allowed. Considering the use cases defined for the RedCap UE, there is also the sport watch use case, and, therefore, this calculated maximum tolerable speed limit is too low. Furthermore, if the same technic is used in the context of carrier aggregation, with the scope of significantly smaller error tolerance, the speed plays a role even with lower velocities. If the accuracy of the system must not be deteriorated at all, regardless of the movement, only the stationary and quasi-stationary cases are okay without any corrective action.

Because the examples described herein focus on the time domain, it is important to understand that the movement here changes the timing of a reference signal (like SRS for positioning in the uplink or PRS in the downlink) propagates between the transmitter and the receiver. If the signal propagates a shorter/longer time to the receiver, the measurement "fails". The receiver cannot understand correctly the error induced. Therefore, the receiver needs a method to know the compensation. The information available from the Doppler shift is applied.

Note that the Doppler shift is per TRP. The movement of the UE is a 3D problem, and the projection of the movement varies TRP by TRP. Even the sign of the value in the Doppler shift changes, depending on if the UE moves towards the TRP or away from the TRP. Furthermore, to simplify the network signaling and the calculation effort, some of the TRP directions might be excluded from the Doppler shift estimation, especially if they are negligible to the accuracy.

Regarding the error in the measurement the following points can be listed. Note that in this description, other sources of errors are not considered like the phase discontinuity, HW (hardware) impairments, frequency gaps between the hops, channel incoherence over the sweep time, demodulation errors, and so on. The issues relevant to the examples described herein include (cases 1-4):

1. Error considered is in the measurement because of the mobility
2. Error considered is between the measurements by different TRPs
3. Error considered is the time-difference between the measurements and reporting
4. Error considered is in the cancelling of hops because of the mobility threshold being exceeded The examples described herein are applicable to case #1 and cover the use case of hopping. The frequency may be a single frequency, but the examples described herein relate to a) the bandwidth per block and b) the arrival time per block. In the RedCap use case the block bandwidth is limited to 20 MHz at FR1, or to 100 MHz at FR2. In other types of bandwidth aggregated systems the block bandwidth may be higher; see, for example, the carrier aggregation case where multiple bands can be combined. The blocks/bands are not necessarily contiguous in the frequency-domain. The non-contiguous allocation presents its own problems when performing the band/block combination. It is assumed that the block/band combination is feasible, regardless of the size of the blocks/bands to be combined or the gaps in between. Later, in 6G, completely new spectrum allocations will be made, which may be very high bandwidth allocations. Thus, the ideas described herein are not limited to the RedCap use case. First considered is the Doppler shift (DS) estimation and frequency domain correction from the received blocks/bands (see later discussion on the reciprocal channels). This DS is block/band specific because of changing frequency and velocity. If the block/band bandwidth is very high, even inside the block/band the DS varies. The method includes implementing techniques to estimate the DS over frequency and velocity. The distance (see FIG. 6) is then, finally, compensated. Next, this distance compensation is discussed in detail. Note that the distance and the time are here the two sides of the coin, and either of these parameters can be used during implementation of the examples described herein.

Consider a single block and the use case where UE moves. The discussion for a moving TRP (TRP is used here to present any receiver, which might in practice be an eNB, gNB, HAPS, satellite, etc.) is similar, therefore the details described herein related to UE movement are applicable to TRP movement. Or, the third case is that both the transmitter and the receiver move; again the case is just more complex from a signaling and error estimation point of view, but the idea described herein remains the same. When the UE moves while transmitting the reference signal SRS for positioning, the block propagation distance changes; if the UE is moving toward the TRP, the distance vanishes, and if the UE is moving away from the TRP, the distance increases. Note that the movement vector is generally not toward or away from the TRP, but considered herein is the projection of the movement toward or away from the TRP. Now, when the distance changes, the time measured for the propagation also changes—for simplicity it may be assumed that distance and time are linearly related to each other. In real life, the media changes the propagation velocity of the electro-magnetic waves, and it may happen that halving the distance does not correspond exactly to half of the propagation time. However, such occurrences are rare in nature and requires the media in between the transmitter and the receiver is not air (vacuum) but electromagnetically (strongly) differing from the vacuum. For simplicity it may be assumed that, a single block may be considered as an entity that arrives a certain time to the receiver. In theory, the transmission time of a block could be that long that the arrival is distributed in time, causing further complications, but it is not a practical assumption. So, a block arrives "earlier" (or "later", depending on the movement direction) as it should arrive. Now, in the positioning event, this same block arrives to multiple TRPs. For simplicity and for better positioning accuracy, it is assumed that the UE is able to transmit SRSes simultaneously for all involved TRPs. If the UE is not able to transmit SRSes simultaneously for all involved TRPs, this condition causes further inaccuracies, and they shall be compensated, if identified and if ever possible to compensate, by some other means. It is noted that the SRSes are usually specified separately in the frequency-domain for every TRP to avoid interference issues. It means it is not a single SRS symbol and read by multiple TRPs but (for example) three symbols transmitted at the same time and frequency multiplexed. However, this 'the same time' may mean different symbols in a slot, or in a worse case, even different slots, depending on UE's capability. In the frequency domain, a single SRS can be extended to be distributed over all the blocks (see FIG. 7 and FIG. 8), which is probably easier from a combining and implementation point of view.

Every TRP sees a different movement, this comes from 3D geometry of the event. Every TRP tries to draw a hyperbola (or similar geometrical curve) depending on the implementation. In FIG. 6, these curves are simple circles (610, 620, 630) but because of the movement the hyperbola gets a wrong location or form. These hyperbolas are then read by the LMF, which makes the final position determination. A wrong position is reported if no corrections are done to the single TRP measured values. As shown in FIG. 6, BS A 170 is associated with circle 610, BS B 170 is associated with circle 620, and BS C 170 is associated with circle 630.

In the frequency hopping case, the blocks (bands) are then received with different time stamps.

As said, the Doppler shift (DS) is used in estimating the needed correction. The discussion above referred to the shortened or lengthened time for the propagation because of the change in distance. DS is a frequency-domain property. The movement changes the frequency of the signal. Methods to run the DS estimation and correction ("frequency offset correction", FOC) to address this physical phenomenon may be implemented. This information can be now reverse engineered to detect the speed of the transmitter (or the receiver, or the combined speed of the transmitter and receiver). Simplified a bit the process, the FOC algorithm gives the speed (per TRP). Now, a new algorithm is used as depicted in FIG. 7 (notation is made for a moving UE and static TRP).

Figure 7:
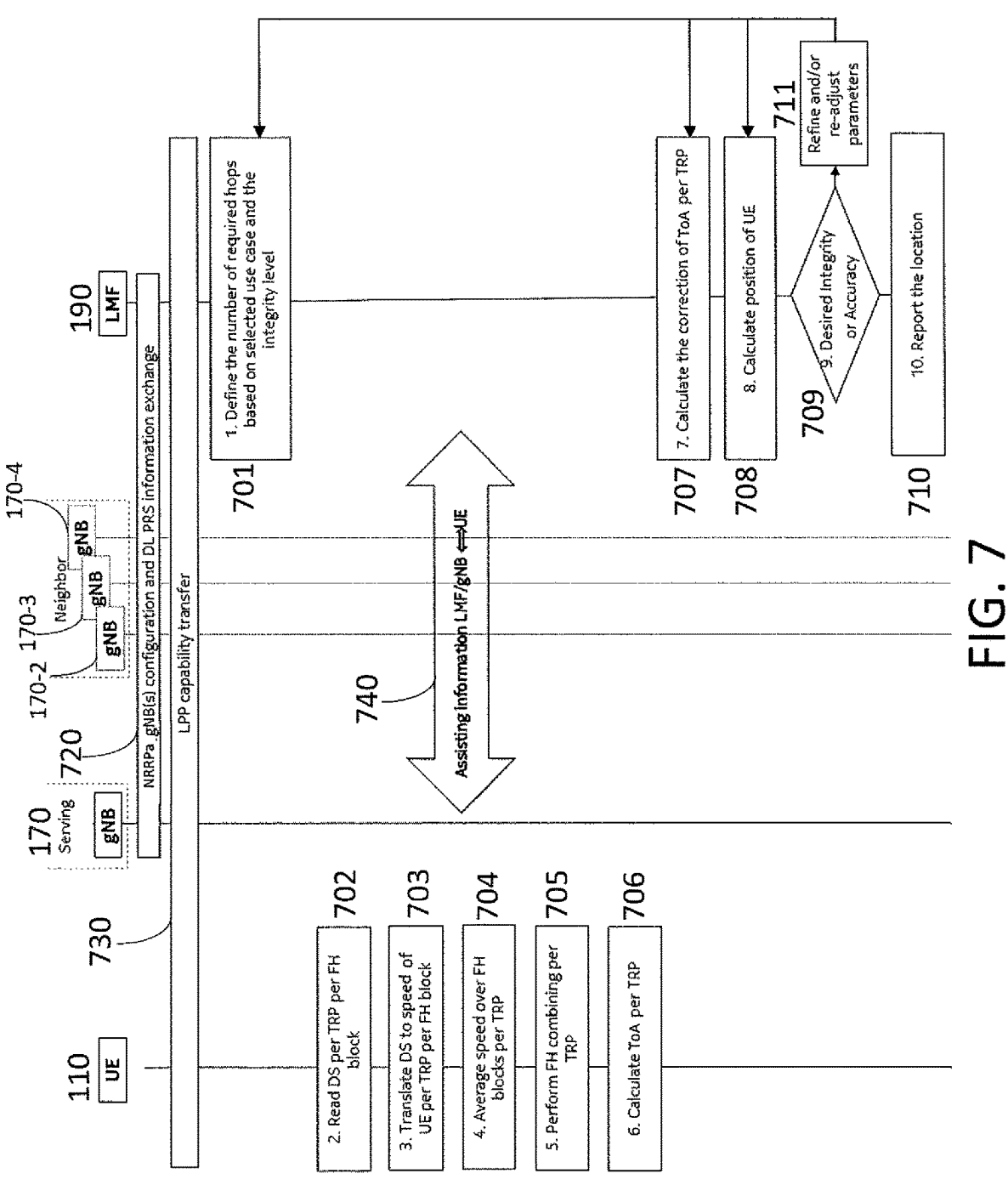
FIG. 7 is a signaling diagram illustrating the algorithm described herein.

FIG. 7 shows a signaling diagram between the UE 110, serving gNB 170, neighbor gNBs (170-2, 170-3, 170-4) and LMF 190. At 720, the serving gNB 170, neighbor gNBs (170-2, 170-3, 170-4) and LMF exchange an NRRPa configuration for the gNBs and DL PRS information. At 730, the UE 110, serving gNB 170, neighbor gNBs (170-2, 170-3, 170-4), and LMF 190 perform LPP capability transfer. At 701, the LMF defines the number of required hops based on the selected use case and the integrity level. At 702, the UE 110 reads the DS per TRP per FH block. At 703, the UE 110 translates the DS to speed of UE 110 per TRP per FH block. At 704, the UE 110 determines average speed over FH blocks per TRP. At 705, the UE 110 performs FH combining per TRP. At 706, the UE 110 calculates ToA per TRP. At 740, assisting information is shared between the UE 110, serving gNB 170, neighbor gNBs (170-2, 170-3, 170-4), and the LMF 190.

At 707, the LMF 190 calculates the correction of ToA per TRP. At 708, the LMF 190 calculates the position of the UE 110. At 709, the LMF 190 determines whether the calculated position of the UE 110 meets a desired integrity or accuracy. If at 709 the LMF 190 determines that the calculated position of the UE 110 calculated at 708 does not meet the desired integrity or accuracy, the method transitions to 711. If at 709 the LMF 190 determines that the calculated position of the UE 110 calculated at 708 does meet the desired integrity or accuracy, the method transitions to 710. At 711, the UE refines and/or re-adjusts parameters and/or recalculates the position of the UE (transitions to 701 and/or 707 and/or 708). At 710, the LMF 190 reports the location of the UE 110.

Figure 8:
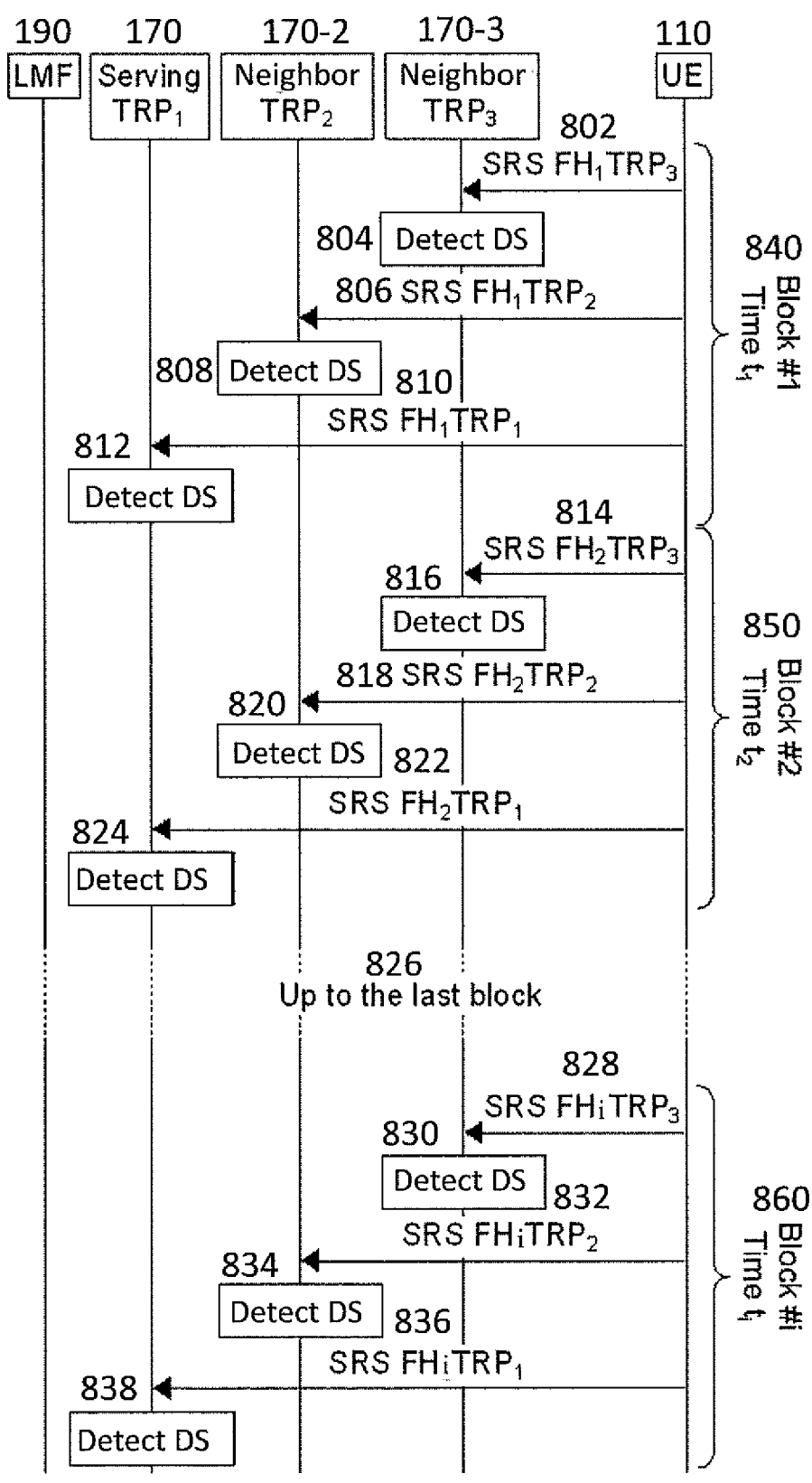
FIG. 8 illustrates frequency hops with SRS for one or more positioning reference signals.
Figure 9:
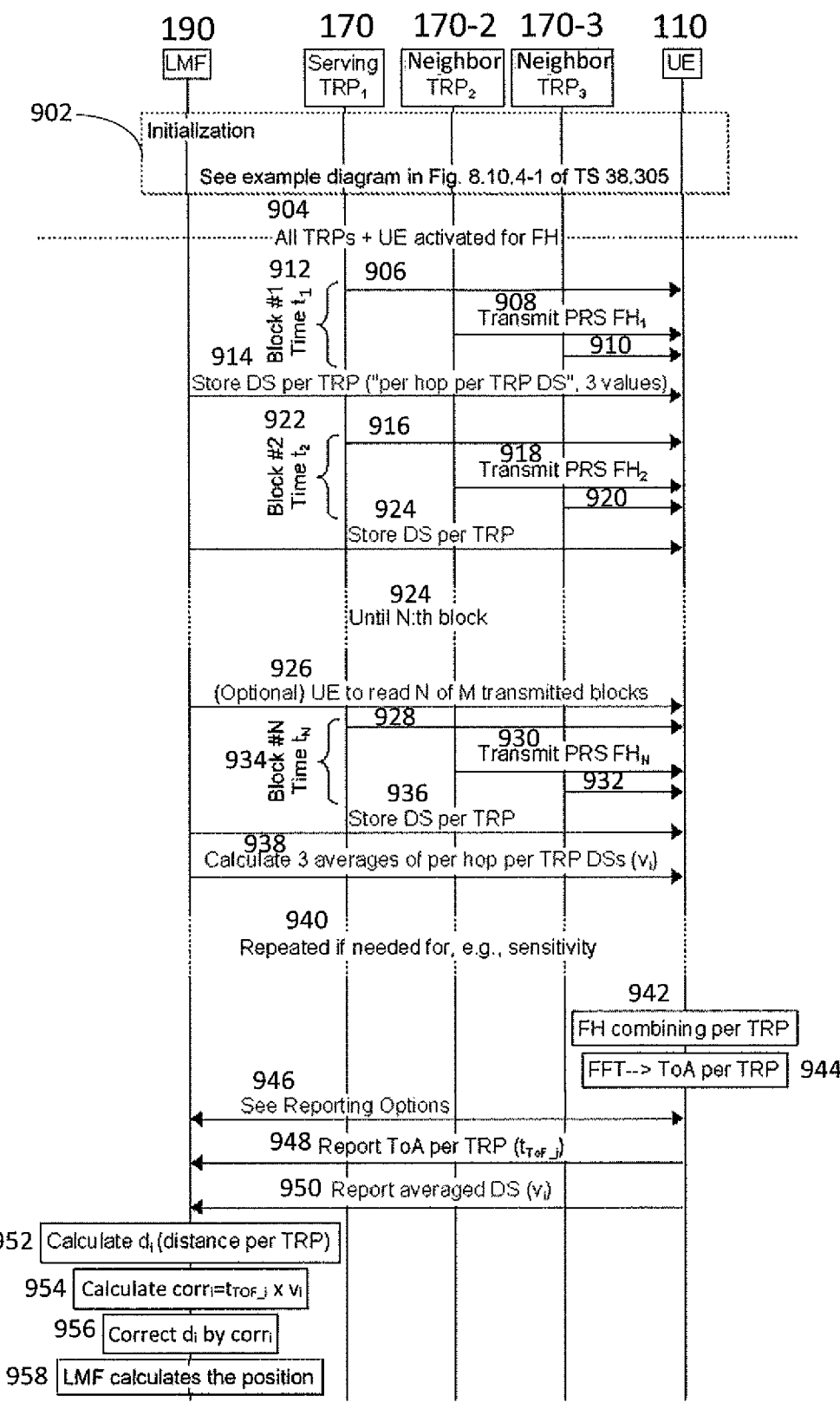
FIG. 9 shows a signal diagram overview for the time-corrected frequency hopping algorithm.

FIG. 8 is made to clarify the frequency hopping (FH) scheme and the time dependencies of SRS blocks. The "differences" in FIG. 8 and FIG. 9 are also to indicate that either direction of DL or UL is feasible for the ideas presented here.

In particular, FIG. 8 shows frequency hops with SRS for a positioning reference signal. FIG. 8 is presented to illustrate the frequency hopping principle, shown from the UE transmission perspective.

At 802, the UE 110 transmits SRS $FH_1TRP_3$ to the neighbor $TRP_3$ 170-3. At 804, the neighbor $TRP_3$ 170-3 detects DS. At 806, the UE 110 transmits SRS $FH_1TRP_2$ to the neighbor $TRP_2$ 170-2. At 808, the neighbor $TRP_2$ 170-2 detects DS. At 810, the UE 110 transmits SRS $FH_1TRP_1$ to the serving $TRP_1$ 170. At 812, the serving $TRP_1$ 170 detects DS. Items 802, 804, 806, 808, 810, and 812 are performed during block #1 at time $t_1$ (840).

At 814, the UE 110 transmits SRS $FH_2TRP_3$ to the neighbor $TRP_3$ 170-3. At 816, the neighbor $TRP_3$ 170-3 detects DS. At 818, the UE 110 transmits SRS $FH_2TRP_2$ to the neighbor $TRP_2$ 170-2. At 820, the neighbor $TRP_2$ 170-2 detects DS. At 822, the UE 110 transmits SRS $FH_2TRP_1$ to the serving $TRP_1$ 170. At 824, the serving $TRP_1$ 170 detects DS. Items 814, 816, 818, 820, 822, and 824 are performed during block #2 at time $t_2$ (850).

Item 826 indicates that the method repeats for $FH_i$ up until the last block.

At 828, the UE 110 transmits SRS $FH_iTRP_3$ to the neighbor $TRP_3$ 170-3. At 830, the neighbor $TRP_3$ 170-3 detects DS. At 832, the UE 110 transmits SRS $FH_iTRP_2$ to the neighbor $TRP_2$ 170-2. At 834, the neighbor $TRP_2$ 170-2 detects DS. At 836, the UE 110 transmits SRS $FH_iTRP_1$ to the serving $TRP_1$ 170. At 838, the serving $TRP_1$ 170 detects DS. Items 828, 830, 832, 834, 836, and 838 are performed during block #i at time $t_i$ (860).

N≤M PRS/SRS Frequency Hops

The algorithmic step #2 described previously (Read DS information per TRP per FH block) concerns the optionality to use less frequency hops than available. Let us assume there are at maximum M hops available. In the first embodiment, LMF requests (e.g. via a configuration) the TRPs (gNBs) to combine at least N≤M SRS frequency hops when the gNBs combine the measurement. In the other embodiment LMF defines a configuration to transmit from TRPs N≤M PRS frequency hops when the UE combines the measurement. Similarly, there could be cases where LMF defines or configures the UE to transmit N≤M hops, or the UE requests the LMF or gNB to configure N<M hops, or even in a bit more complex case, a single TRP (which may be a gNB) requests LMF to configure a case, where this TRP transmits L<N≤M hops while other TRPs involved transmit N≤M hops. The default case could be, without any signaling passed, to use the maximum number of available hops.

The decision mechanism on what are the parameters L and N, is based on the integrity. The integrity is further described herein (refer to the discussion related to positioning integrity and discussion related to FIG. 11 and FIG. 12). LMF checks the integrity results such as horizontal and/or vertical protection level reported from the UE. If the reported integrity results do not reach the integrity requirement, LMF requests the UE or gNB to refine or re-adjust the FH blocks. Some use cases from the integrity point of view are listed herein.

Energy saving in the form of dropping out last hops: when the desired level of integrity is achieved with a non-maximal number of hops, the triggering mechanism is to count how many hops are at a minimum required to the desired reliability. No more is transmitted.

Spectrum efficiency/cell level capacity: RedCap UEs are banned or not banned to camp to the same cells as usual NR UEs. When the capacity of the cell is an issue, the network may limit the number of hops to release some spectrum to be used primarily for other purposes.

Positioning accuracy: The frequency hopping method has been developed to increase the positioning accuracy, but in some applications the accuracy requirement is rather low. Thus, within one and the same cell, different UEs have different requirements and, thus, also from the FH point of view a different number of hops is required.

Time Domain Correction

The time domain correction is as follows. The measured Doppler shift is known from FOC. The Doppler shift formula is defined in Equation 2:

$$f = \left( \frac{c \pm v_r}{c \pm v_s} \right) f_0 \qquad \text{(Equation 2)}$$

Because the measured Doppler shift is known from FOC, it is possible to resolve the velocity of the transmitter ($v_{s,i,j}$) (i-th block, j-th TRP, see FIG. 8 and FIG. 9). If $v_{r,i,j} \neq 0$, mathematically the solution of the Equation 2 is more complex, and no unique solution exists, but more conditions are needed. In a network the mobility of the TRP is generally known, if any mobility is applied, because the TRP is not a device moving randomly but the TRP serves the users and, therefore, its mobility is strictly controlled. Thus, the UE speed is solved from Equation 2 unambiguously. Next, because the propagation speed of electromagnetic waves is very high compared to the speed of UE (in all practical implementations), the time measured for the propagation time from the transmitter to the receiver is used as such, without searching for the time correction. Thus, the time of the block $t_{i,j}$ is known and $v_{s,i,j}$ is known. The distance correction $d_{i,j}$ is $$d_{i,j} = t_{i,j} \cdot v_{s,i,j}. \qquad \text{(Equation 3)}$$

It should be noted that the explanation above for $d_{i,j}$ is made per block for clarity. In practice, it is not accurate to estimate the position of the UE per block. For example, estimating the UE position using just a single block is inaccurate because of the narrow bandwidth of a single block, which is the reason the methods described herein use frequency hopping. The time of arrival estimation, if done per block, suffers from the narrow bandwidth. Therefore, the algorithm implementation changes the order of steps a little bit to take the advantage of the frequency hopping. All the speed values per block are recorded, and an average value over the blocks is calculated. This average value is used to correct the time (or distance) to be reported to LMF after the combination of FH blocks to the full bandwidth. This order is included in the algorithm listed with reference to operations 1-9 described herein and in FIG. 9.

For example, with reference to FIG. 9, the speed of the UE 110 determined using the reference signal transmitted at 906 is determined, the speed of the UE 110 determined using the reference signal transmitted at 916 is determined, and the speed of the UE 110 determined using the reference signal transmitted at 928 is determined. These three N speeds are averaged (summed then divided by N, where N is the number of blocks) to determine a first average speed associated with TRP₁ 170. The speed of the UE 110 determined using the reference signal transmitted at 908 is determined, the speed of the UE 110 determined using the reference signal transmitted at 918 is determined, and the speed of the UE 110 determined using the reference signal transmitted at 930 is determined. These three N speeds are averaged (summed then divided by N, where N is the number of blocks) to determine a second average speed associated with TRP₂ 170-2. The speed of the UE 110 determined using the reference signal transmitted at 910 is determined, the speed of the UE 110 determined using the reference signal transmitted at 920 is determined, and the speed of the UE 110 determined using the reference signal transmitted at 932 is determined. These three N speeds are averaged (summed then divided by N, where N is the number of blocks) to determine a third average speed associated with TRP₃ 170-3. The first average speed, the second average speed, and the third average speed may be reported to the LMF 190 (for example by UE 110), and the LMF may use the first average speed, the second average speed, and the third average speed to determine the position of the UE 110 by adjusting a determined distance based on the first average speed, the second average speed, and the third average speed.

With reference to FIG. 8, TRP₁ 170 may determine a speed of the UE 110 based on the reference signal transmitted at 810, TRP₁ 170 may determine a speed of the UE 110 based on the reference signal transmitted at 822, and TRP₁ 170 may determine a speed of the UE 110 based on the reference signal transmitted at 836. These three N speeds are averaged (summed then divided by N, where N is the number of blocks) to determine a first average speed of the UE 110. TRP₂ 170-2 may determine a speed of the UE 110 based on the reference signal transmitted at 806, TRP₂ 170-2 may determine a speed of the UE 110 based on the reference signal transmitted at 818, and TRP₂ 170-2 may determine a speed of the UE 110 based on the reference signal transmitted at 832. These three N speeds are averaged (summed then divided by N, where N is the number of blocks) to determine a second average speed of the UE 110. TRP₃ 170-3 may determine a speed of the UE 110 based on the reference signal transmitted at 802, TRP₃ 170-3 may determine a speed of the UE 110 based on the reference signal transmitted at 814, and TRP₃ 170-3 may determine a speed of the UE 110 based on the reference signal transmitted at 828. These three N speeds are averaged (summed then divided by N, where N is the number of blocks) to determine a third average speed of the UE 110. The first average speed may be transmitted by TRP₁ 170 to the LMF 190, the second average speed may be transmitted by TRP₂ 170-2 to the LMF 190, and the third average speed may be transmitted by TRP₃ 170-3 to the LMF 190. The LMF may use the first average speed, the second average speed, and the third average speed received from TRP₁, TRP₂, and TRP₃ to determine the position of the UE 110 by adjusting a determined distance based on the first average speed, the second average speed, and the third average speed.

As it relates to the examples described herein, "Tim-eOfDeparture" is time of departure of the positioning reference signals from the respective transmission reception point. However, this definition is applicable only when the positioning reference signal (PRS) is sent with the full bandwidth, not using FH. The TRP might send PRS also in the FH mode, but then the definition of the TimeOfDeparture is block-wise. However, in such a case it is enough to know the first block's time of departure (TOD) because others are then calculated from the length of the symbol and gap between the symbols, and these parameters are controlled. In an embodiment, the block-wise TOD measurement is omitted. However, when SRS is transmitted in the UL case, there by definition the full bandwidth transmission does not exist, and therefore, the only option to measure the time is to use block-wise TOD. The LMF knows TOD from TRP as part of the routine signaling.

A frequency hopping block refers to a frequency hop of DL PRS or UL SRS. In one example, a frequency hopping block corresponds to a positioning reference signal received from a transmission reception point at a time. In another example, a frequency hopping block corresponds to a sounding reference signal transmitted from a user equipment at a time.

It may be possible to compensate also the ToA as well as the distance. Thus, the methods described herein for the correction are a) ToA correction and b) distance correction through a time parameter. The distance cannot be calculated if the corrected ToA is not available (strictly speaking, both ToA and ToD are needed, but ToD is part of normal signaling routine). But ToA can be calculated without considering any distance calculation.

The discussion above has referred to the receiver when estimating DS. This is quite natural because the receiver senses the over-the-air channel and makes the channel estimation, including the identification of the movement as described herein. However, in many situations the inverse direction is also used because in most cases the over-the-air channel is reciprocal. The network may define the downlink reference signals, which UE reads and estimates the channel. UE, in turn, uses the information from these downlink signals for its uplink reference signals. Therefore, the ideas described herein are not limited to downlink only or uplink only use cases.

The error case #2 means that the delays from the measurements until the UE position is reported is understood to be present. The case occurs when for any reason the network fails to perform the measurements at multiple TRPs at the same time.

The error case #3 is in FIG. 5.

The error case #4 is a new case. It is covered with reference to the discussion of N≤M PRS/SRS frequency hops described herein.

In different use cases the energy savings could be used to simplify the process described above. For example, if assuming approximately constant movement during the hops, which is a fairly reasonable assumption because of the law of inertia for any physical object, the speed evaluation is not done for all hops, but once or any lower number than the full number of blocks per TRP. Theoretically, some of the hops could be also 'stationary', so no speed evaluation needed, but this is for the same law of inertia impractical. On the other hand, if UE knows its movement, it can report this directly to LMF, and no speed evaluation is needed. A cross-validation of the reported corrections could be also implemented to increase the integrity of the positioning; for example, in a method subsequent locations are used to estimate the next one, and if the on-line compensation leads to the same position, the integrity is at a high level. The other cross-validation method is to combine the speed projections of all involved TRPs, to form a 3D movement curve and if the smoothness of the curve is high enough, the single projections have been then correctly calculated.

Signal Diagram

The above explanations are next described in the form of a signal diagram shown in FIG. 9. The TRP transmission— where the TRP can be, for example, a gNB such as gNB 170, gNB 170-2, or gNB 170-3)—can be also with full bandwidth at the time but repeating the symbols until UE 110 has switched through all the hops covering the TRP transmitted bandwidth. In such a case the TRP (170, 170-2, 170-3) needs to pass the information on how wide the applied bandwidth is, potentially also defining to UE 110 what kind of size of hops to use. A number of three (3) TRPs is used here, but the number of TRPs and, thus, positioning vector directions could be any number greater than 3. The number of averages reflects the number of TRPs. The correction calculations could be done also by UE 110; LMF 190 then takes care of configuring UE 110 to perform the necessary steps. The reported averaged DS contains also the parameters used, for example, how many hops are used or if any other mathematical function is applied.

FIG. 9 thus shows a signaling diagram overview for the time-corrected frequency hopping algorithm described herein.

At 902, the LMF 190, serving $TRP_1$ 170, neighbor $TRP_2$ 170-2, neighbor $TRP_3$ 170-3, and UE 110 perform initialization. At 904, all TRPs (serving $TRP_1$ 170, neighbor $TRP_2$ 170-2, neighbor $TRP_3$ 170-3) and the UE 110 are activated for FH, which activation may involve LMF 190.

At 906, the serving $TRP_1$ 170 transmits PRS $FH_1$ to UE 110. At 908, the neighbor $TRP_2$ 170-2 transmits PRS $FH_1$ to UE 110. At 910, the neighbor $TRP_3$ 170 transmits PRS $FH_1$ to UE 110. Items 906, 908, and 910 occur during block #1 at time $t_1$ (912). At 914, the LMF 190 transmits information to UE 110 so that the UE 110 can store DS per TRP ("per hop per TRP DS", 3 values).

At 916, the serving $TRP_1$ 170 transmits PRS $FH_2$ to UE 110. At 918, the neighbor $TRP_2$ 170-2 transmits PRS $FH_2$ to UE 110. At 920, the neighbor $TRP_3$ 170 transmits PRS $FH_2$ to UE 110. Items 916, 918, and 920 occur during block #2 at time $t_2$ (922). At 924, the LMF transmits information to UE 110 so that the UE 110 can store DS per TRP.

Item 924 indicates that the process is repeated until the Nth block. At 926, optionally the LMF transmits information to the UE 110 so that the UE 110 reads N of M transmitted blocks.

At 928, the serving $TRP_1$ 170 transmits PRS $FH_N$ to UE 110. At 930, the neighbor $TRP_2$ 170-2 transmits PRS $FH_N$ to UE 110. At 932, the neighbor $TRP_3$ 170 transmits PRS $FH_N$ to UE 110. Items 928, 930, and 932 occur during block #N at time to (934). At 936, the LMF 190 transmits information to UE 110 so that the UE 110 can store DS per TRP.

At 938, the LMF 190 transmits information to the UE 110 so that the UE calculates 3 averages (one average per TRP) of per hop per TRP DSs ($v_i$, the variable i in this instance being the number of TRPs), and transmits this information to UE 110. Item 940 indicates that the process is repeated if needed for, as an example, sensitivity. At 942, the UE 110 performs FH combining per TRP. At 944, the UE 110 performs an FFT, and calculates ToA per TRP.

At 946, the LMF 190 and UE 110 perform reporting based on 3 options (1-3):

1) UE 110 performs compensation of RSTD or UE Rx-Tx time difference measurement reflecting its mobility and reports the compensated measurement.

2) LMF 190 requests UE 110 to perform RSTD or UE Rx-Tx time difference measurement compensation based on its mobility and reports the compensated measurements.

3) The UE 110 reports its capability (for example to LMF 190) that the UE 110 can compensate/correct the RSTD/UE Rx-Tx time difference measurement.

At 948, the UE 110 reports ToA per TRP ($t_{TOF\_i}$, the variable i being the number of TRPs). At 950, the UE 110 reports averaged DS ($v_i$). At 952, the LMF 190 calculates $d_i$ (distance per TRP). At 954, the LMF calculates $corr_i = t_{TOF\_i}$ multiplied by $v_i$. At 956, the LMF corrects $d_i$ by $corr_i$. At 958, the LMF calculates the position of the UE 110.

An Illustrative Example for the Relation of Bandwidth and Time-Domain Accuracy

The following is additional information to understand better the advantages and technical effects of the frequency hopping algorithm discussed in 3GPP. The text discusses the accuracy from a standard deviation point of view.

The achievable accuracy of the time based positioning method can be established via the standard deviation $$\sigma_i^{ToA}$$

[Equation 4], defined as $$\sigma_i^{ToA} = \frac{c}{2\sqrt{2}\,\pi\sqrt{\frac{P}{N_o}T\,BW_i}}, \qquad \text{(Equation 4)}$$

In Equation 4, c is the speed of light, P is received power, $N_o$ is noise spectral density, T is the integration or measurement time. The parameter $BW_i$ denotes the bandwidth of carrier frequency $f_i$ and corresponding wavelength $\lambda_i$, which is used for the positioning measurements.

FIG. 10 depicts an illustrative example of achievable accuracy with parameter values {$\lambda_i$=8.57 cm, P/$N_o$=15 dB. Hz} and with the increasing bandwidth of the sounding reference signal. It is worth highlighting that equation (4) is one possible example case, and these expressions may change for different system configurations, i.e., OFDM, etc. However, the underlying relationship between the parameters, e.g., $$\sigma_i^{ToA} \propto 1/BW_i$$

still holds with different scalings, and thus, FIG. 10 provides an overview and trend of achievable accuracy with the sounding bandwidth.

It can be noted from FIG. 10 that the achievable accuracy of the time is very sensitive to the configured bandwidth of the sounding reference signal. It is worth highlighting that the sounding bandwidth is not a foe but a friend, since the network node can efficiently resolve the multi-path components and obtain precise ToF/TDoA measurements due to higher temporal resolutions, which mainly inherit from the large bandwidth configurations.

Integrity

The definition of the positioning integrity: it is a measure of the trust in the accuracy of the position-related data provided by the positioning system and the ability to provide timely and valid warnings when the positioning system does not fulfil the condition for intended operation.

Checking the reliability of position estimates is vital for several life-threatening applications. However, in the context of the examples described herein, the life-threatening aspects is not the only triggering function. The resource saving could be used equally as the primary mechanism to decide the integrity threshold. The integrity described herein may be from a life-threatening perspective.

Several factors can affect location accuracy. There are natural causes such as noise and interference, but also intentional causes such as jamming and spoofing.

Figure 11:
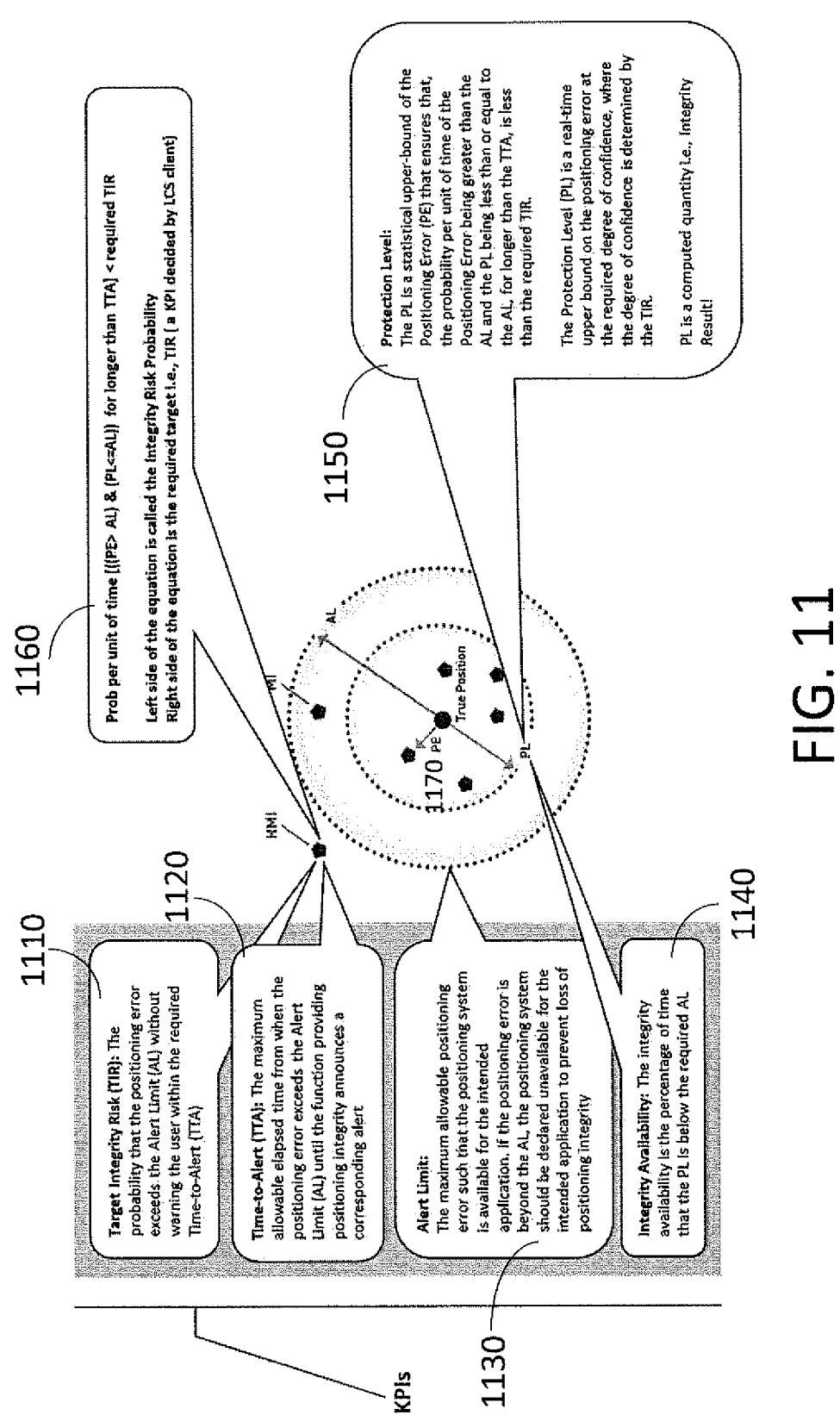
FIG. 11 shows integrity related definitions.

The framework, initially developed for GNSS, uses the following integrity related definitions (1-5) which are also shown in FIG. 11:

1. Target Integrity Risk (TIR) 1110: The probability that the positioning error exceeds the Alert Limit (AL) without warning the user within the required Time-to-Alert (TTA).

2. Alert Limit (AL) 1130: The maximum allowable positioning error such that the positioning system is available for the intended application. If the positioning error is beyond the AL, the positioning system should be declared unavailable for the intended application to prevent loss of positioning integrity.
3. Time-to-Alert (TTA) 1120: The maximum allowable elapsed time from when the positioning error exceeds the Alert Limit (AL) until the function providing positioning integrity annunciates a corresponding alert.
4. Integrity Availability (IA) 1140: The integrity availability is the percentage of time that the PL is below the required AL.
5. Protection Level (PL) 1150: The PL is a (calculated) statistical upper-bound of the Positioning Error (PE) 1170 that ensures that, the probability per unit of time of the true error being greater than the AL and the PL being less than or equal to the AL, for longer than the TTA, is less than the required TIR.

TIR, AL, TTA and IA are system requirements. PL is calculated by the system.

The system seeks to control the probability of the positioning error exceeding the AL without the user being warned. This is the most critical situation, as the user will exploit the information without knowing that it is very likely erroneous. This probability is called TIR. To this end, the system calculates the PL. The PL must satisfy a statistical upper-bound of the Positioning Error (PE) that ensures that the probability of the true error being greater than the AL and the PL being less than or equal to the AL, for longer than the TTA, is less than the required TIR.

Probability per unit of time [((PE>AL) & (PL<=AL)) for longer than TTA]<required TIR In the above probability per unit of time formulation (also shown at 1160), PE designates the (true, unknown) positioning error.

Several events can occur (including 1-2 below), as illustrated by the Stanford diagram shown in FIG. 12:

1. PL<AL: the system is declared available.
1a. Nominal operation when PE<PL.
1b. Hazardous misleading information when PE>AL: a hazardously misleading information event occurs when, being the system declared available, the position error exceeds the alert limit. This should happen with a probability less than TIR.
1c. Misleading information when PE<AL: a misleading information event occurs when, being the system declared available, the position error exceeds the protection level but not the alert limit.
2. PL>AL: the system is declared unavailable.
2a. PL is too conservative when PE<AL: the system is declared unavailable even if it could be declared available.
2b. Alerting the user of a potential integrity loss is justified in the other cases.

A tighter PL over bounding is preferable and sometimes necessary to reduce the unavailability periods and fulfill the IA requirement.

Figure 12:
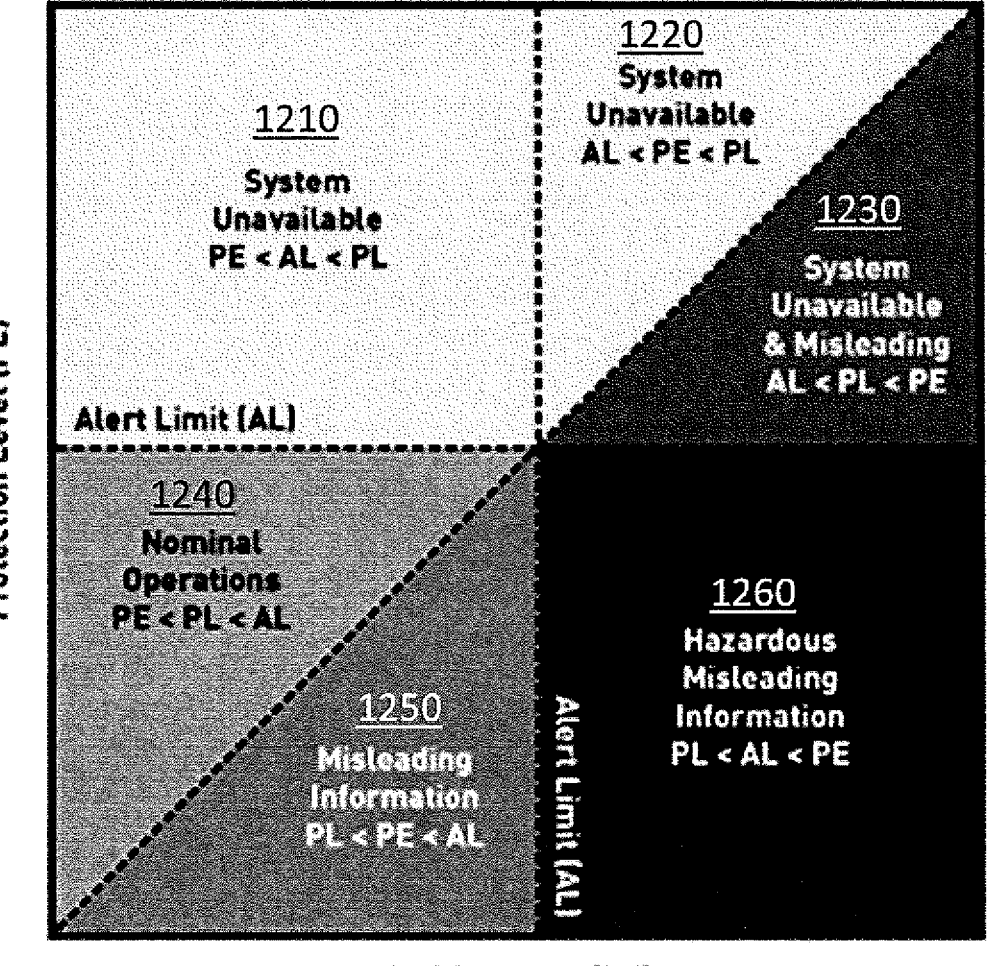
FIG. 12 shows a Stanford diagram.

As shown in FIG. 12 there are various possibilities: System Unavailable, where PE<AL<PL (1210), System Unavailable, where AL<PE<PL (1220), System Unavailable and Misleading, where AL<PL<PE (1230), Nominal Operations, where PE<PL<AL (1240), Misleading Information, where PL<PE<AL (1250), and Hazardous Misleading Information, where PL<AL<PE (1260).

The method described here enables positioning of a RedCap UE regardless of its stationarity. It means improved user satisfaction, because the user may expect a freedom to move while scanning their positions. The limitation to the static case in positioning is not feasible in a technical and user experience. The idea described herein may be standardized in 3GPP.

Figure 13:
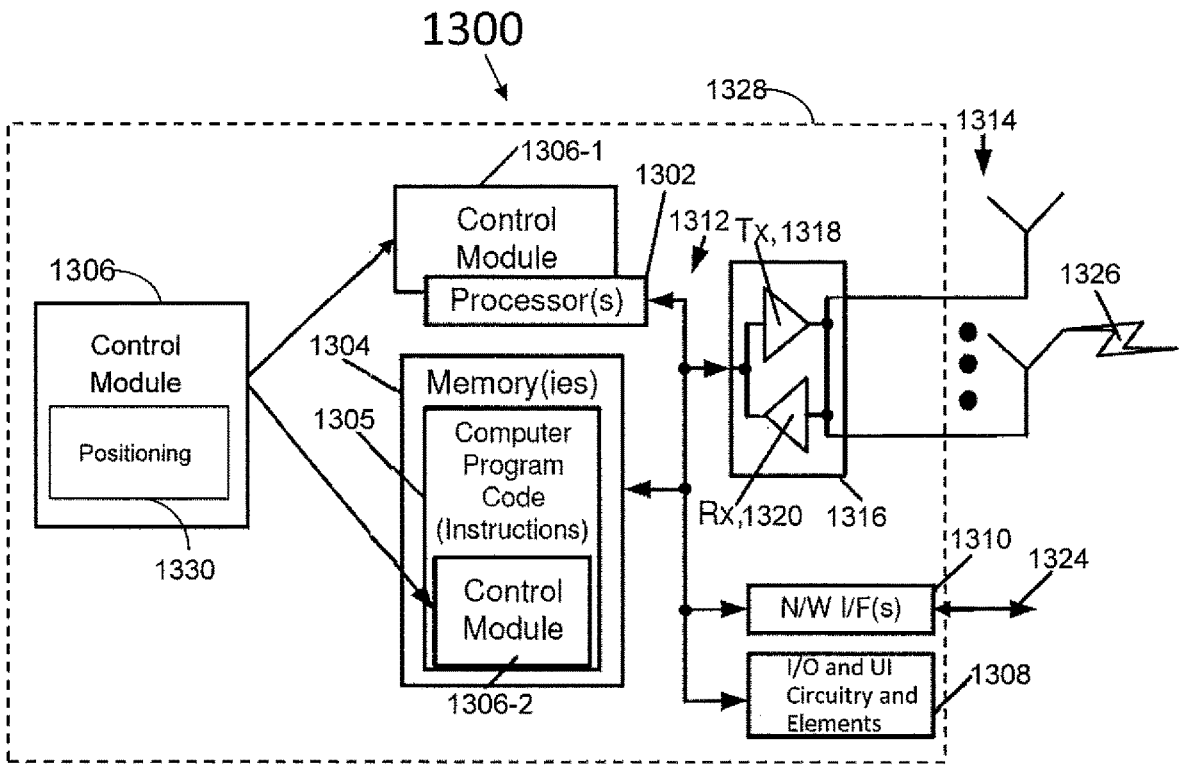
FIG. 13 is an example apparatus configured to implement the examples described herein.

FIG. 13 is an example apparatus 1300, which may be implemented in hardware, configured to implement the examples described herein. The apparatus 1300 comprises at least one processor 1302 (e.g. an FPGA and/or CPU), one or more memories 1304 including computer program code 1305, the computer program code 1305 having instructions to carry out the methods described herein, wherein the at least one memory 1304 and the computer program code 1305 are configured to, with the at least one processor 1302, cause the apparatus 1300 to implement circuitry, a process, component, module, or function (implemented with control module 1306) to implement the examples described herein. The memory 1304 may be a non-transitory memory, a transitory memory, a volatile memory (e.g. RAM), or a non-volatile memory (e.g. ROM). Positioning 1330 of the control module implements the herein described aspects related to positioning.

The apparatus 1300 includes a display and/or I/O interface 1308, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 1300 includes one or more communication e.g. network (N/W) interfaces (I/F(s)) 1310. The communication I/F(s) 1310 may be wired and/or wireless and communicate over the Internet/other network(s) via any communication technique including via one or more links 1324. The link(s) 1324 may be the link(s) 131 and/or 176 from FIG. 1. The link(s) 131 and/or 176 from FIG. 1 may also be implemented using transceiver(s) 1316 and corresponding wireless link(s) 1326. The communication I/F(s) 1310 may comprise one or more transmitters or one or more receivers.

The transceiver 1316 comprises one or more transmitters 1318 and one or more receivers 1320. The transceiver 1316 and/or communication I/F(s) 1310 may comprise standard well-known components such as an amplifier, filter, frequency-converter, (de) modulator, and encoder/decoder circuitries and one or more antennas, such as antennas 1314 used for communication over wireless link 1326.

The control module 1306 of the apparatus 1300 comprises one of or both parts 1306-1 and/or 1306-2, which may be implemented in a number of ways. The control module 1306 may be implemented in hardware as control module 1306-1, such as being implemented as part of the one or more processors 1302. The control module 1306-1 may be implemented also as an integrated circuit or through other hardware such as a programmable gate array. In another example, the control module 1306 may be implemented as control module 1306-2, which is implemented as computer program code (having corresponding instructions) 1305 and is executed by the one or more processors 1302. For instance, the one or more memories 1304 store instructions that, when executed by the one or more processors 1302, cause the apparatus 1300 to perform one or more of the operations as described herein. Furthermore, the one or more processors 1302, the one or more memories 1304, and example algorithms (e.g., as flowcharts and/or signaling diagrams), encoded as instructions, programs, or code, are means for causing performance of the operations described herein.

The apparatus 1300 to implement the functionality of control 1306 may be UE 110, RAN node 170 (e.g. gNB), or network element(s) 190 (e.g. LMF 190). Thus, processor 1302 may correspond to processor(s) 120, processor(s) 152 and/or processor(s) 175, memory 1304 may correspond to one or more memories 125, one or more memories 155 and/or one or more memories 171, computer program code 1305 may correspond to computer program code 123, computer program code 153, and/or computer program code 173, control module 1306 may correspond to module 140-1, module 140-2, module 150-1, and/or module 150-2, and communication I/F(s) 1310 and/or transceiver 1316 may correspond to transceiver 130, antenna(s) 128, transceiver 160, antenna(s) 158, N/W I/F(s) 161, and/or N/W I/F(s) 180. Alternatively, apparatus 1300 and its elements may not correspond to either of UE 110, RAN node 170, or network element(s) 190 and their respective elements, as apparatus 1300 may be part of a self-organizing/optimizing network (SON) node or other node, such as a node in a cloud.

Apparatus 1300 may also correspond to neighbor gNBs 170-2, 170-3, and/or 170-4.

The apparatus 1300 may also be distributed throughout the network (e.g. 100) including within and between apparatus 1300 and any network element (such as a network control element (NCE) 190 and/or the RAN node 170 and/or UE 110).

Interface 1312 enables data communication and signaling between the various items of apparatus 1300, as shown in FIG. 13. For example, the interface 1312 may be one or more buses such as address, data, or control buses, and may include any interconnection mechanism, such as a series of lines on a motherboard or integrated circuit, fiber optics or other optical communication equipment, and the like. Computer program code (e.g. instructions) 1305, including control 1306 may comprise object-oriented software configured to pass data or messages between objects within computer program code 1305. The apparatus 1300 need not comprise each of the features mentioned, or may comprise other features as well. The various components of apparatus 1300 may at least partially reside in a common housing 1328, or a subset of the various components of apparatus 1300 may at least partially be located in different housings, which different housings may include housing 1328.

Figure 14:
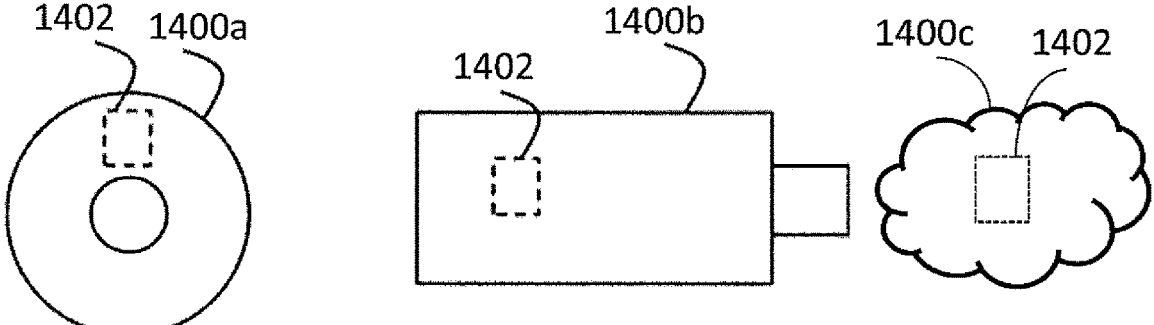
FIG. 14 shows a representation of an example of non-volatile memory media used to store instructions that implement the examples described herein.

FIG. 14 shows a schematic representation of non-volatile memory media 1400a (e.g. computer/compact disc (CD) or digital versatile disc (DVD)) and 1400b (e.g. universal serial bus (USB) memory stick) and 1400c (e.g. cloud storage for downloading instructions and/or parameters 1402 or receiving emailed instructions and/or parameters 1402) storing instructions and/or parameters 1402 which when executed by a processor allows the processor to perform one or more of the steps of the methods described herein. Instructions and/or parameters 1402 may represent a non-transitory computer readable medium.

FIG. 15 is an example method 1500, based on the example embodiments described herein. At 1510, the method includes determining Doppler shift information per transmission reception point per frequency hopping block. At 1520, the method includes combining the frequency hopping blocks associated with positioning reference signals received from a transmission reception point per transmission reception point. At 1530, the method includes determining a time of arrival of the received positioning reference signals per transmission reception point, based on the combined frequency hopping blocks. At 1540, the method includes transmitting, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus. At 1550, the method includes transmitting, to the location management function, the time of arrival per transmission reception point. Method 1500 may be performed with UE 110 or apparatus 1300.

FIG. 16 is an example method 1600, based on the example embodiments described herein. At 1610, the method includes transmitting, to a user equipment, an indication of a number of frequency hopping blocks, the frequency hopping blocks corresponding to respective times positioning reference signals are transmitted to the user equipment. At 1620, the method includes receiving, from the user equipment, an average speed of the user equipment from a point of view of a respective transmission reception point over the frequency hopping blocks per transmission reception point for a number of transmission reception points. At 1630, the method includes receiving, from the user equipment, a time of arrival of the positioning reference signals per transmission reception point, based on a combination of the frequency hopping blocks corresponding to the respective times the positioning reference signals are transmitted to the user equipment. At 1640, the method includes determining a distance of the user equipment from the transmission reception points per transmission reception point. At 1650, the method includes adjusting the distance of the user equipment from the transmission reception points per transmission reception point, based on the time of arrival per transmission reception point and the average speed of the user equipment from the point of view of the respective transmission reception point over the frequency hopping blocks per transmission reception point. At 1660, the method includes determining a position of the user equipment, based on the adjusted distance of the user equipment from the transmission reception points per transmission reception point. Method 1600 may be performed with one or more network elements 190 (e.g. LMF 190) or apparatus 1300.

FIG. 17 is an example method 1700, based on the example embodiments described herein. At 1710, the method includes receiving, from a plurality of transmission reception points, an average speed of a user equipment from a point of view of a respective transmission reception point over a number of frequency hopping blocks per transmission reception point. At 1720, the method includes receiving, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment. At 1730, the method includes determining a distance of the user equipment from the plurality of transmission reception points. At 1740, the method includes adjusting the distance of the user equipment from the transmission reception points per transmission reception point, based on at least one: of the positioning measurement for the transmission reception points, or the average speed of the user equipment from the point of view of each transmission reception point over the frequency hopping blocks. At 1750, the method includes determining a position of the user equipment, based on the adjusted distance of the user equipment from the transmission reception points per transmission reception point. Method 1700 may be performed with one or more network elements 190 (e.g. LMF 190) or apparatus 1300.

FIG. 18 is an example method 1800, based on the example embodiments described herein. At 1810, the method includes determining Doppler shift information per frequency hopping block for a number of frequency hopping blocks. At 1820, the method includes determining a speed of the user equipment per frequency hopping block, based on the Doppler shift information. At 1830, the method includes determining an average speed of the user equipment from a point of view of the apparatus over the frequency hopping blocks, based on the determined speeds. At 1840, the method includes combining the frequency hopping blocks associated with sounding reference signals received from the user equipment. At 1850, the method includes determining a positioning measurement based on the sounding reference signals received from the user equipment, based on the combining of the frequency hopping blocks. At 1860, the method includes transmitting, to a location management function, the average speed of the user equipment from the point of view of the apparatus over the frequency hopping blocks. At 1870, the method includes transmitting, to the location management function, the positioning measurement based on the sounding reference signals received from the user equipment. Method 1800 may be performed with RAN node 170 (e.g. serving gNB or TRP$_1$ 170), neighbor gNB or TRP$_2$, 170-2, neighbor gNB or TRP$_3$ 170-3, neighbor gNB or TRP$_4$ 170-4 or apparatus 1300.

The following examples are provided and described herein.

Example 1. An apparatus including: at least one processor; and at least one non-transitory memory storing instructions that, when executed by the at least one processor, cause the apparatus at least to: determine Doppler shift information per transmission reception point per frequency hopping block; combine the frequency hopping blocks associated with positioning reference signals received from a transmission reception point per transmission reception point; determine a time of arrival of the received positioning reference signals per transmission reception point, based on the combined frequency hopping blocks; transmit, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and transmit, to the location management function, the time of arrival per transmission reception point.

Example 2. The apparatus of example 1, wherein the instructions, when executed by the at least one processor, cause the apparatus at least to: receive, from the location management function, an indication of the number of frequency hopping blocks.

Example 3. The apparatus of example 2, wherein the number of frequency hopping blocks for which the Doppler shift information is determined is less than a number of frequency hopping blocks for which the positioning reference signals are received from the transmission reception points.

Example 4. The apparatus of any of examples 1 to 3, wherein the instructions, when executed by the at least one processor, cause the apparatus at least to: transmit, to the transmission reception points, a sounding reference signal per transmission reception point per a frequency hopping block corresponding to a respective time the sounding reference signal is transmitted to the transmission reception points.

Example 5. The apparatus of any of examples 1 to 4, wherein the instructions, when executed by the at least one processor, cause the apparatus at least to: determine at least one of a compensated time difference measurement or a compensated Rx-Tx time difference measurement per transmission reception point, based on the speed or the average speed of the apparatus from the point of view of the respective transmission reception point over the frequency hopping blocks per transmission reception point; and transmit, to the location management function, at least one of the compensated time difference measurement or the compensated Rx-Tx time difference measurement per transmission reception point.

Example 6. The apparatus of example 5, wherein the instructions, when executed by the at least one processor, cause the apparatus at least to: receive, from the location management function, a request to determine at least one of the compensated time difference measurement or the Rx-Tx time difference measurement based on the average speed of the apparatus from the point of view of the respective transmission reception point over the frequency hopping blocks per transmission reception point.

Example 7. The apparatus of example 6, wherein the instructions, when executed by the at least one processor, cause the apparatus at least to: transmit, to the location management function, an indication of a capability of the apparatus to determine the compensated time difference measurement or the compensated Rx-Tx time difference measurement per transmission reception point, based on the average speed of the apparatus from the point of view of the respective transmission reception point over the frequency hopping blocks per transmission reception point.

Example 8. The apparatus of any of examples 1 to 7, wherein the instructions, when executed by the at least one processor, cause the apparatus at least to: determine a full bandwidth aggregation per transmission reception point, based on the combining of the frequency hopping blocks associated with positioning reference signals received from a transmission reception point per transmission reception point; wherein the time of arrival of the received positioning reference signals per transmission reception point is determined based on the full bandwidth aggregation.

Example 9. The apparatus of any of examples 1 to 8, wherein the instructions, when executed by the at least one processor, cause the apparatus at least to: determine a full carrier aggregation per transmission reception point, based on the combining of the frequency hopping blocks associated with positioning reference signals received from a transmission reception point per transmission reception point; wherein the time of arrival of the received positioning reference signals per transmission reception point is determined based on the full carrier aggregation.

Example 10. The apparatus of any of examples 1 to 9, wherein a positioning measurement includes a time of arrival and the time of arrival is used with the location management function to determine a positioning reference signal traveling time per transmission reception point as the time of arrival of the positioning reference signals with the user equipment for a respective transmission reception point minus a time of departure of the positioning reference signals from the respective transmission reception point, and to determine a correction for a transmission reception point to be the positioning reference signal traveling time of a respective transmission reception point multiplied by the average speed of the user equipment from the point of view of the respective transmission reception point over the frequency hopping blocks for the respective transmission reception point, wherein a distance of the user equipment to the respective transmission reception point is adjusted based on the correction for the respective transmission reception point.

Example 11. The apparatus of any of examples 1 to 10, wherein the instructions, when executed by the at least one processor, cause the apparatus at least to: determine the speed of the apparatus per transmission reception point per frequency hopping block, based on the Doppler shift information; and determine the average speed of the apparatus from a point of view of a respective transmission reception point over the frequency hopping blocks per transmission reception point, based on the determined speeds.

Example 12. An apparatus including: at least one processor; and at least one non-transitory memory storing instructions that, when executed by the at least one processor, cause the apparatus at least to: transmit, to a user equipment, an indication of a number of frequency hopping blocks, the frequency hopping blocks corresponding to respective times positioning reference signals are transmitted to the user equipment; receive, from the user equipment, an average speed of the user equipment from a point of view of a respective transmission reception point over the frequency hopping blocks per transmission reception point for a number of transmission reception points; receive, from the user equipment, a time of arrival of the positioning reference signals per transmission reception point, based on a combination of the frequency hopping blocks corresponding to the respective times the positioning reference signals are transmitted to the user equipment; determine a distance of the user equipment from the transmission reception points per transmission reception point; adjust the distance of the user equipment from the transmission reception points per transmission reception point, based on the time of arrival per transmission reception point and the average speed of the user equipment from the point of view of the respective transmission reception point over the frequency hopping blocks per transmission reception point; and determine a position of the user equipment, based on the adjusted distance of the user equipment from the transmission reception points per transmission reception point.

Example 13. The apparatus of example 12, wherein the instructions, when executed by the at least one processor, cause the apparatus at least to: determine whether the determined position meets an integrity level or accuracy level; and adjust the number of frequency hopping blocks, in response to the determined position not meeting the integrity level or accuracy level.

Example 14. The apparatus of any of examples 12 to 13, wherein the instructions, when executed by the at least one processor, cause the apparatus at least to: receive, from the user equipment, a compensated time difference measurement per transmission reception point, based on the average speed of the user equipment from the point of view of the respective transmission reception point over the frequency hopping blocks per transmission reception point; and determine the position of the user equipment, based on the compensated time difference measurement per transmission reception point received from the user equipment.

Example 15. The apparatus of example 14, wherein the instructions, when executed by the at least one processor, cause the apparatus at least to: transmit, to the user equipment, a request to determine the compensated time difference measurement based on the average speed of the user equipment from the point of view of the respective transmission reception point over the frequency hopping blocks per transmission reception point.

Example 16. The apparatus of example 15, wherein the instructions, when executed by the at least one processor, cause the apparatus at least to: receive, from the user equipment, an indication of a capability of the user equipment to determine the compensated time difference measurement per transmission reception point, based on the average speed of the user equipment from the point of view of the respective transmission reception point over the frequency hopping blocks per transmission reception point.

Example 17. The apparatus of any of examples 12 to 16, wherein the instructions, when executed by the at least one processor, cause the apparatus at least to: determine a positioning reference signal traveling time per transmission reception point to be the time of arrival of the positioning reference signals with the user equipment for a respective transmission reception point minus a time of departure of the positioning reference signals from the respective transmission reception point; determine a correction for a transmission reception point to be the positioning reference signal traveling time of a respective transmission reception point multiplied by the average speed of the user equipment from the point of view of the respective transmission reception point over the frequency hopping blocks for the respective transmission reception point; wherein the distance of the user equipment to the respective transmission reception point is adjusted based on the correction for the respective transmission reception point.

Example 18. The apparatus of any of examples 12 to 17, wherein the instructions, when executed by the at least one processor, cause the apparatus at least to: receive, from a plurality of transmission reception points, an average speed of the user equipment from a point of view of a respective transmission reception point over a number of frequency hopping blocks corresponding to a respective time a sounding reference signal is transmitted from the user equipment to the transmission reception points; receive, from the plurality of transmission reception points, a time of arrival of the sounding reference signal the respective transmission reception point received from the user equipment, based on a combination of the frequency hopping blocks corresponding to the respective times the sounding reference signals are received by the transmission reception points from the user equipment; adjust the distance of the user equipment from the transmission reception points per transmission reception point, based on the time of arrival of the sounding reference signal per transmission reception point and the average speed of the user equipment from the point of view of the respective transmission reception point over the frequency hopping blocks per transmission reception point; and determine the position of the user equipment, based on the adjusted distance of the user equipment from the transmission reception points per transmission reception point based on the time of arrival of the sounding reference signal per transmission reception point.

Example 19. The apparatus of any of examples 12 to 18, wherein the number of frequency hopping blocks indicated by the apparatus to the user equipment and for which the average speed and time of arrival are determined is less than a number of frequency hopping blocks for which the positioning reference signals are received by the user equipment from the transmission reception points.

Example 20. The apparatus of any of examples 12 to 19, wherein the combination of the frequency hopping blocks comprises a full bandwidth aggregation.

Example 21. The apparatus of any of examples 12 to 20, wherein the combination of the frequency hopping blocks comprises a full carrier aggregation.

Example 22. An apparatus including: at least one processor; and at least one non-transitory memory storing instructions that, when executed by the at least one processor, cause the apparatus at least to: receive, from a plurality of transmission reception points, an average speed of a user equipment from a point of view of a respective transmission reception point over a number of frequency hopping blocks per transmission reception point; receive, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment; determine a distance of the user equipment from the plurality of transmission reception points; adjust the distance of the user equipment from the transmission reception points per transmission reception point, based on at least one: of the positioning measurement for the transmission reception points, or the average speed of the user equipment from the point of view of each transmission reception point over the frequency hopping blocks; and determine a position of the user equipment, based on the adjusted distance of the user equipment from the transmission reception points per transmission reception point.

Example 23. The apparatus of example 22, wherein the instructions, when executed by the at least one processor, cause the apparatus at least to: determine whether the determined position meets an integrity level or accuracy level; and adjust the number of frequency hopping blocks, in response to the determined position not meeting the integrity level or accuracy level.

Example 24. The apparatus of any of examples 22 to 23, wherein the instructions, when executed by the at least one processor, cause the apparatus at least to: transmit, to at least one of the plurality of transmission reception points, an indication of the number of frequency hopping blocks.

Example 25. The apparatus of example 24, wherein the number of frequency hopping blocks indicated by the apparatus to the at least one transmission reception point and for which the respective average speed and respective time of arrival are determined is less than a number of frequency hopping blocks for which the sounding reference signals are received by the at least one transmission reception point from the user equipment.

Example 26. The apparatus of any of examples 22 to 25, wherein the instructions, when executed by the at least one processor, cause the apparatus at least to: determine a sounding reference signal traveling time per transmission reception point to be the respective time of arrival of the sounding reference signal the respective transmission reception point received from the user equipment minus a respective time of departure of the sounding reference signal from the user equipment; determine a correction for a transmission reception point to be the sounding reference signal traveling time of the respective transmission reception point multiplied by the average speed of the user equipment from the point of view of the respective transmission reception point over the frequency hopping blocks per transmission reception point; wherein the distance of the user equipment to the respective transmission reception point is adjusted based on the correction.

Example 27. The apparatus of any of examples 22 to 26, wherein the combination of the frequency hopping blocks comprises a full bandwidth aggregation.

Example 28. The apparatus of any of examples 22 to 27, wherein the combination of the frequency hopping blocks comprises a full carrier aggregation.

Example 29. An apparatus including: at least one processor; and at least one non-transitory memory storing instructions that, when executed by the at least one processor, cause the apparatus at least to: determine Doppler shift information per frequency hopping block for a number of frequency hopping blocks; determine a speed of the user equipment per frequency hopping block, based on the Doppler shift information; determine an average speed of the user equipment from a point of view of the apparatus over the frequency hopping blocks, based on the determined speeds; combine the frequency hopping blocks associated with sounding reference signals received from the user equipment; determine a positioning measurement based on the sounding reference signals received from the user equipment, based on the combining of the frequency hopping blocks; transmit, to a location management function, the average speed of the user equipment from the point of view of the apparatus over the frequency hopping blocks; and transmit, to the location management function, the positioning measurement based on the sounding reference signals received from the user equipment.

Example 30. The apparatus of example 29, wherein the instructions, when executed by the at least one processor, cause the apparatus at least to: receive, from the location management function, an indication of the number of frequency hopping blocks for which the Doppler shift information is determined.

Example 31. The apparatus of example 30, wherein the number of frequency hopping blocks for which the Doppler shift information is determined is less than a number of frequency hopping blocks for which the sounding reference signals are received from the user equipment.

Example 32. The apparatus of any of examples 29 to 31, wherein the instructions, when executed by the at least one processor, cause the apparatus at least to: determine a full bandwidth aggregation per transmission reception point, based on the combining of the frequency hopping blocks associated with the sounding reference signals received from the user equipment; wherein the positioning measurement based on the sounding reference signals received from the user equipment is based on the full bandwidth aggregation.

Example 33. The apparatus of any of examples 29 to 32, wherein the instructions, when executed by the at least one processor, cause the apparatus at least to: determine a full carrier aggregation per transmission reception point, based on the combining of the frequency hopping blocks associated with the sounding reference signals received from the user equipment; wherein the positioning measurement based on the sounding reference signals received from the user equipment is based on the full carrier aggregation.

Example 34. The apparatus of any of examples 29 to 33, wherein the positioning measurement includes a time of arrival and the time of arrival is used with the location management function to determine a sounding reference signal traveling time for the apparatus as a respective time of arrival of the sounding reference signal the apparatus received from the user equipment minus a respective time of departure of the sounding reference signal from the user equipment, and to determine a correction for the apparatus as the sounding reference signal traveling time of the apparatus multiplied by the average speed of the user equipment from the point of view of the apparatus over the frequency hopping blocks, wherein a distance of the user equipment to the apparatus is adjusted based on the correction.

Example 35. The apparatus of any of examples 29 to 34, wherein the positioning measurement comprises a relative time of arrival, a Rx-Tx time difference, or a reference signal received power.

Example 36. A method including: determining Doppler shift information per transmission reception point per frequency hopping block; combining the frequency hopping blocks associated with positioning reference signals received from a transmission reception point per transmission reception point; determining a time of arrival of the received positioning reference signals per transmission reception point, based on the combined frequency hopping blocks; transmitting, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and transmitting, to the location management function, the time of arrival per transmission reception point.

Example 37. A method including: transmitting, to a user equipment, an indication of a number of frequency hopping blocks, the frequency hopping blocks corresponding to respective times positioning reference signals are transmitted to the user equipment; receiving, from the user equipment, an average speed of the user equipment from a point of view of a respective transmission reception point over the frequency hopping blocks per transmission reception point for a number of transmission reception points; receiving, from the user equipment, a time of arrival of the positioning reference signals per transmission reception point, based on a combination of the frequency hopping blocks corresponding to the respective times the positioning reference signals are transmitted to the user equipment; determining a distance of the user equipment from the transmission reception points per transmission reception point; adjusting the distance of the user equipment from the transmission reception points per transmission reception point, based on the time of arrival per transmission reception point and the average speed of the user equipment from the point of view of the respective transmission reception point over the frequency hopping blocks per transmission reception point; and determining a position of the user equipment, based on the adjusted distance of the user equipment from the transmission reception points per transmission reception point.

Example 38. A method including: receiving, from a plurality of transmission reception points, an average speed of a user equipment from a point of view of a respective transmission reception point over a number of frequency hopping blocks per transmission reception point; receiving, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment; determining a distance of the user equipment from the plurality of transmission reception points; adjusting the distance of the user equipment from the transmission reception points per transmission reception point, based on at least one: of the positioning measurement for the transmission reception points, or the average speed of the user equipment from the point of view of each transmission reception point over the frequency hopping blocks; and determining a position of the user equipment, based on the adjusted distance of the user equipment from the transmission reception points per transmission reception point.

Example 39. A method including: determining Doppler shift information per frequency hopping block for a number of frequency hopping blocks; determining a speed of the user equipment per frequency hopping block, based on the Doppler shift information; determining an average speed of the user equipment from a point of view of the apparatus over the frequency hopping blocks, based on the determined speeds; combining the frequency hopping blocks associated with sounding reference signals received from the user equipment; determining a positioning measurement based on the sounding reference signals received from the user equipment, based on the combining of the frequency hopping blocks; transmitting, to a location management function, the average speed of the user equipment from the point of view of the apparatus over the frequency hopping blocks; and transmitting, to the location management function, the positioning measurement based on the sounding reference signals received from the user equipment.

Example 40. An apparatus including: means for determining Doppler shift information per transmission reception point per frequency hopping block; means for combining the frequency hopping blocks associated with positioning reference signals received from a transmission reception point per transmission reception point; means for determining a time of arrival of the received positioning reference signals per transmission reception point, based on the combined frequency hopping blocks; means for transmitting, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and means for transmitting, to the location management function, the time of arrival per transmission reception point.

Example 41. An apparatus including: means for transmitting, to a user equipment, an indication of a number of frequency hopping blocks, the frequency hopping blocks corresponding to respective times positioning reference signals are transmitted to the user equipment; means for receiving, from the user equipment, an average speed of the user equipment from a point of view of a respective transmission reception point over the frequency hopping blocks per transmission reception point for a number of transmission reception points; means for receiving, from the user equipment, a time of arrival of the positioning reference signals per transmission reception point, based on a combination of the frequency hopping blocks corresponding to the respective times the positioning reference signals are transmitted to the user equipment; means for determining a distance of the user equipment from the transmission reception points per transmission reception point; means for adjusting the distance of the user equipment from the transmission reception points per transmission reception point, based on the time of arrival per transmission reception point and the average speed of the user equipment from the point of view of the respective transmission reception point over the frequency hopping blocks per transmission reception point; and means for determining a position of the user equipment, based on the adjusted distance of the user equipment from the transmission reception points per transmission reception point.

Example 42. An apparatus including: means for receiving, from a plurality of transmission reception points, an average speed of a user equipment from a point of view of a respective transmission reception point over a number of frequency hopping blocks per transmission reception point; means for receiving, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment; means for determining a distance of the user equipment from the plurality of transmission reception points; means for adjusting the distance of the user equipment from the transmission reception points per transmission reception point, based on at least one: of the positioning measurement for the transmission reception points, or the average speed of the user equipment from the point of view of each transmission reception point over the frequency hopping blocks; and means for determining a position of the user equipment, based on the adjusted distance of the user equipment from the transmission reception points per transmission reception point.

Example 43. An apparatus including: means for determining Doppler shift information per frequency hopping block for a number of frequency hopping blocks; means for determining a speed of the user equipment per frequency hopping block, based on the Doppler shift information; means for determining an average speed of the user equipment from a point of view of the apparatus over the frequency hopping blocks, based on the determined speeds; means for combining the frequency hopping blocks associated with sounding reference signals received from the user equipment; means for determining a positioning measurement based on the sounding reference signals received from the user equipment, based on the combining of the frequency hopping blocks; means for transmitting, to a location management function, the average speed of the user equipment from the point of view of the apparatus over the frequency hopping blocks; and means for transmitting, to the location management function, the positioning measurement based on the sounding reference signals received from the user equipment.

Example 44. A non-transitory computer readable medium including program instructions stored thereon for performing at least the following: determining Doppler shift information per transmission reception point per frequency hopping block; combining the frequency hopping blocks associated with positioning reference signals received from a transmission reception point per transmission reception point; determining a time of arrival of the received positioning reference signals per transmission reception point, based on the combined frequency hopping blocks; transmitting, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and transmitting, to the location management function, the time of arrival per transmission reception point.

Example 45. A non-transitory computer readable medium including program instructions stored thereon for performing at least the following: transmitting, to a user equipment, an indication of a number of frequency hopping blocks, the frequency hopping blocks corresponding to respective times positioning reference signals are transmitted to the user equipment; receiving, from the user equipment, an average speed of the user equipment from a point of view of a respective transmission reception point over the frequency hopping blocks per transmission reception point for a number of transmission reception points; receiving, from the user equipment, a time of arrival of the positioning reference signals per transmission reception point, based on a combination of the frequency hopping blocks corresponding to the respective times the positioning reference signals are transmitted to the user equipment; determining a distance of the user equipment from the transmission reception points per transmission reception point; adjusting the distance of the user equipment from the transmission reception points per transmission reception point, based on the time of arrival per transmission reception point and the average speed of the user equipment from the point of view of the respective transmission reception point over the frequency hopping blocks per transmission reception point; and determining a position of the user equipment, based on the adjusted distance of the user equipment from the transmission reception points per transmission reception point.

Example 46. A non-transitory computer readable medium including program instructions stored thereon for performing at least the following: receiving, from a plurality of transmission reception points, an average speed of a user equipment from a point of view of a respective transmission reception point over a number of frequency hopping blocks per transmission reception point; receiving, from the plurality of transmission reception points, a respective positioning measurement that includes a time of arrival of a sounding reference signal transmitted from the user equipment, based on a combination of the frequency hopping blocks corresponding to the respective times the sounding reference signals are received by the transmission reception points from the user equipment; determining a distance of the user equipment from the plurality of transmission reception points; adjusting the distance of the user equipment from the transmission reception points per transmission reception point, based on at least one: of the positioning measurement for the transmission reception points, or the average speed of the user equipment from the point of view of each transmission reception point over the frequency hopping blocks; and determining a position of the user equipment, based on the adjusted distance of the user equipment from the transmission reception points per transmission reception point.

Example 47. A non-transitory computer readable medium including program instructions stored thereon for performing at least the following: determining Doppler shift information per frequency hopping block for a number of frequency hopping blocks; determining a speed of the user equipment per frequency hopping block, based on the Doppler shift information; determining an average speed of the user equipment from a point of view of the apparatus over the frequency hopping blocks, based on the determined speeds; combining the frequency hopping blocks associated with sounding reference signals received from the user equipment; determining a positioning measurement based on the sounding reference signals received from the user equipment, based on the combining of the frequency hopping blocks; transmitting, to a location management function, the average speed of the user equipment from the point of view of the apparatus over the frequency hopping blocks; and transmitting, to the location management function, the positioning measurement based on the sounding reference signals received from the user equipment.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative, Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number, and may be case insensitive):

| | |
|---|---|
| 3D | three dimensional |
| 3GPP | third generation partnership project |
| 4G | fourth generation |
| 5G | fifth generation |
| 5GC | 5G core network |
| 6G | sixth generation |
| AL | alert limit |
| AMF | access and mobility management function |
| ASIC | application-specific integrated circuit |
| Batt | battery |

US 12,672,098 B2

-continued

| BS | base station |
| BW | bandwidth |
| BWP | bandwidth part |
| Cat-M2 | category M2 |
| Cat-NB2 | category narrowband 2 |
| CD | compact/computer disc |
| Cov. Enh | coverage enhancement |
| corr | correction |
| CP | cyclic prefix |
| CPP | carrier-phased positioning |
| CPU | central processing unit |
| CU | central unit or centralized unit |
| DL | downlink |
| DS | Doppler shift |
| DSP | digital signal processor |
| DU | distributed unit |
| DVD | digital versatile disc |
| EC-GPRS | extended coverage general packet radio services |
| eMTC | enhanced machine-type communication |
| eNB | evolved Node B (e.g., an LTE base station) |
| EN-DC | E-UTRAN new radio-dual connectivity |
| en-gNB | node providing NR user plane and control plane protocol terminations towards the UE, and acting as a secondary node in EN-DC |
| eRedCap | enhanced reduced capability |
| eFeMTC | even further enhanced machine type communication |
| E-UTRA | evolved universal terrestrial radio access, i.e., the LTE radio access technology |
| E-UTRAN | E-UTRA network |
| F1 | interface between the CU and the DU |
| FDD | frequency division duplex |
| FeMTC | further enhanced machine-type communications |
| FFS | for further study |
| FFT | fast Fourier transform |
| FH | frequency hopping |
| FOC | frequency offset correction |
| FPGA | field-programmable gate array |
| FR1 | frequency range 1 |
| gNB | base station for 5G/NR, i.e., a node providing NR user plane and control plane protocol terminations towards the UE, and connected via the NG interface to the 5GC |
| GNSS | global navigation satellite system |
| HAPS | high altitude platform stations |
| HMI | hazardously misleading information |
| HW | hardware |
| IA | integrity availability |
| IAB | integrated access and backhaul |
| I/F | interface |
| I/O | input/output |
| IoT | internet of things |
| KPI | key performance indicator |
| LCS | location services |
| LMF | location management function |
| LPP | LTE positioning protocol |
| LPWA | low-power wide-area |
| LTE | long term evolution (4G) |
| MAC | medium access control |
| MI | misleading information |
| MME | mobility management entity |
| MRO | mobility robustness optimization |
| MTC | machine-type communications |
| NB-IoT | narrowband-internet of things |
| NCE | network control element |
| ng or NG | new generation |
| ng-eNB | new generation eNB |
| NG-RAN | new generation radio access network |
| Non-BL | non-bandwidth limited |
| NR | new radio |
| NRPPa | NR positioning protocol A |
| N/W | network |
| OFDM | orthogonal frequency division multiplexing |
| OTDOA | observed time difference of arrival |
| PDA | personal digital assistant |
| PDCP | packet data convergence protocol |

-continued

| PHY | physical layer |
| PE | positioning error |
| PL | protection level |
| PRS | positioning reference signal |
| RAM | random access memory |
| RAN | radio access network |
| RAN1 | radio layer 1 |
| RAN2 | RAN working group 2 |
| RedCap | reduced capability |
| Rel | release |
| RLC | radio link control |
| ROM | read-only memory |
| RP | RAN plenary |
| RRC | radio resource control |
| RS | reference signal |
| RSTD | reference signal time difference |
| RTOA | relative time of arrival |
| RU | radio unit |
| Rx | receiver or reception |
| SCS | subcarrier spacing |
| SDAP | service data adaptation protocol |
| SGW | serving gateway |
| SMF | session management function |
| SON | self-organizing/optimizing network |
| SRS-P | sounding reference signal for positioning |
| SRS | sounding reference signal |
| TDoA | time difference of arrival |
| TDD | time division duplex |
| TIR | target integrity risk |
| ToA | time of arrival |
| ToF | time of flight |
| TR | technical report |
| TRP | transmission reception point |
| TS | technical specification |
| TTA | time to alert |
| Tx, TX | transmitter or transmission |
| UAV | unmanned aerial vehicle |
| UE | user equipment (e.g., a wireless, typically mobile device) |
| UI | user interface |
| UL | uplink |
| UPF | user plane function |
| USB | universal serial bus |
| VOLTE | voice over LTE |
| X2 | network interface between RAN nodes and between RAN and the core network |
| Xn | network interface between NG-RAN nodes |
| WI | work item |
| WID | work item description |

What is claimed is:

1. An apparatus comprising:

at least one processor; and at least one non-transitory memory storing instructions that, when executed by the at least one processor, cause the apparatus at least to:

determine Doppler shift information per transmission reception point per frequency hopping block;

combine the frequency hopping blocks associated with positioning reference signals received from a transmission reception point per transmission reception point;

determine a time of arrival of the received positioning reference signals per transmission reception point, based on the combined frequency hopping blocks;

transmit, to a location management function, at least one of: an average speed of the apparatus from the respective transmission reception point over the frequency hopping blocks, or an adjusted positioning measurement based on at least one of the determined time of arrival, a Doppler frequency, and a speed of the apparatus; and transmit, to the location management function, the time of arrival per transmission reception point.

2. The apparatus of claim 1, wherein the instructions, when executed by the at least one processor, cause the apparatus at least to:

receive, from the location management function, an indication of the number of frequency hopping blocks.

3. The apparatus of claim 2, wherein the number of frequency hopping blocks for which the Doppler shift information is determined is less than a number of frequency hopping blocks for which the positioning reference signals are received from the transmission reception points.

4. The apparatus of claim 1, wherein the instructions, when executed by the at least one processor, cause the apparatus at least to:

determine at least one of a compensated time difference measurement or a compensated Rx-Tx time difference measurement per transmission reception point, based on the speed or the average speed of the apparatus from the point of view of the respective transmission reception point over the frequency hopping blocks per transmission reception point; and transmit, to the location management function, at least one of the compensated time difference measurement or the compensated Rx-Tx time difference measurement per transmission reception point.

5. The apparatus of claim 4, wherein the instructions, when executed by the at least one processor, cause the apparatus at least to:

receive, from the location management function, a request to determine at least one of the compensated time difference measurement or the Rx-Tx time difference measurement based on the average speed of the apparatus from the point of view of the respective transmission reception point over the frequency hopping blocks per transmission reception point.

6. The apparatus of claim 5, wherein the instructions, when executed by the at least one processor, cause the apparatus at least to:

transmit, to the location management function, an indication of a capability of the apparatus to determine the compensated time difference measurement or the compensated Rx-Tx time difference measurement per transmission reception point, based on the average speed of the apparatus from the point of view of the respective transmission reception point over the frequency hopping blocks per transmission reception point.

7. The apparatus of claim 1, wherein the instructions, when executed by the at least one processor, cause the apparatus at least to:

determine a full bandwidth aggregation per transmission reception point, based on the combining of the frequency hopping blocks associated with positioning reference signals received from a transmission reception point per transmission reception point;

wherein the time of arrival of the received positioning reference signals per transmission reception point is determined based on the full bandwidth aggregation.

8. The apparatus of claim 1, wherein a positioning measurement includes a time of arrival and the time of arrival is used with the location management function to determine a positioning reference signal traveling time per transmission reception point as the time of arrival of the positioning reference signals with the user equipment for a respective transmission reception point minus a time of departure of the positioning reference signals from the respective transmission reception point, and to determine a correction for a transmission reception point to be the positioning reference signal traveling time of a respective transmission reception point multiplied by the average speed of the user equipment from the point of view of the respective transmission reception point over the frequency hopping blocks for the respective transmission reception point, wherein a distance of the user equipment to the respective transmission reception point is adjusted based on the correction for the respective transmission reception point.

9. The apparatus of claim 1, wherein the instructions, when executed by the at least one processor, cause the apparatus at least to:

determine the speed of the apparatus per transmission reception point per frequency hopping block, based on the Doppler shift information; and determine the average speed of the apparatus from a point of view of a respective transmission reception point over the frequency hopping blocks per transmission reception point, based on the determined speeds.

10. A method comprising:

determining Doppler shift information per transmission reception point per frequency hopping block;

combining the frequency hopping blocks associated with positioning reference signals received from a transmission reception point per transmission reception point;

determining a time of arrival of the received positioning reference signals per transmission reception point, based on the combined frequency hopping blocks;

transmitting, to a location management function, at least one of: an average speed of an apparatus from the respective transmission reception point over the frequency hopping blocks, or an adjusted positioning measurement based on at least one of the determined time of arrival, a Doppler frequency, and a speed of the apparatus; and transmitting, to the location management function, the time of arrival per transmission reception point.

11. The method of claim 10, further comprising:

receiving, from the location management function, an indication of the number of frequency hopping blocks.

12. The method of claim 11, wherein the number of frequency hopping blocks for which the Doppler shift information is determined is less than a number of frequency hopping blocks for which the positioning reference signals are received from the transmission reception points.

13. The method of claim 10, further comprising:

determining at least one of a compensated time difference measurement or a compensated Rx-Tx time difference measurement per transmission reception point, based on the speed or the average speed of an apparatus from the point of view of the respective transmission reception point over the frequency hopping blocks per transmission reception point; and transmitting, to the location management function, at least one of the compensated time difference measurement or the compensated Rx-Tx time difference measurement per transmission reception point.

14. The method of claim 13, further comprising:

receiving, from the location management function, a request to determine at least one of the compensated time difference measurement or the Rx-Tx time difference measurement based on the average speed of the apparatus from the point of view of the respective transmission reception point over the frequency hopping blocks per transmission reception point.

15. The method of claim 14, further comprising:

transmitting, to the location management function, an indication of a capability of the apparatus to determine the compensated time difference measurement or the compensated Rx-Tx time difference measurement per transmission reception point, based on the average speed of the apparatus from the point of view of the respective transmission reception point over the frequency hopping blocks per transmission reception point.

16. The method of claim 10, further comprising:

determining a full bandwidth aggregation per transmission reception point, based on the combining of the frequency hopping blocks associated with positioning reference signals received from a transmission reception point per transmission reception point;

wherein the time of arrival of the received positioning reference signals per transmission reception point is determined based on the full bandwidth aggregation.

17. The method of claim 10, wherein a positioning measurement includes a time of arrival and the time of arrival is used with the location management function to determine a positioning reference signal traveling time per transmission reception point as the time of arrival of the positioning reference signals with the user equipment for a respective transmission reception point minus a time of departure of the positioning reference signals from the respective transmission reception point, and to determine a correction for a transmission reception point to be the positioning reference signal traveling time of a respective transmission reception point multiplied by the average speed of the user equipment from the point of view of the respective transmission reception point over the frequency hopping blocks for the respective transmission reception point, wherein a distance of the user equipment to the respective transmission reception point is adjusted based on the correction for the respective transmission reception point.

18. The method of claim 10, further comprising:

determining the speed of an apparatus per transmission reception point per frequency hopping block, based on the Doppler shift information; and determining the average speed of the apparatus from a point of view of a respective transmission reception point over the frequency hopping blocks per transmission reception point, based on the determined speeds.

* * * * *